US007399442B2

(12) United States Patent
Sabin et al.

(10) Patent No.: US 7,399,442 B2
(45) Date of Patent: Jul. 15, 2008

(54) MULTILAYER MOLDING USING TEMPERATURE ADJUSTMENT OF FLOW RATE IN CONJUNCTION WITH SHOOTING POT TECHNOLOGY

(75) Inventors: Douglas Sabin, Marblehead, MA (US); Paul Swenson, South Hamilton, MA (US); Ronald Roberts, Melrose, MA (US)

(73) Assignee: Kortec, Inc., Ipswich, MA (US)

( * ) Notice: Subject to any disclaimer, the term of this patent is extended or adjusted under 35 U.S.C. 154(b) by 243 days.

(21) Appl. No.: 11/177,464

(22) Filed: Jul. 7, 2005

(65) Prior Publication Data

US 2006/0029691 A1    Feb. 9, 2006

Related U.S. Application Data

(60) Provisional application No. 60/586,151, filed on Jul. 7, 2004.

(51) Int. Cl.
*B29C 45/22* (2006.01)
(52) U.S. Cl. .................................... 264/328.8; 425/130
(58) Field of Classification Search ............... 425/130, 425/133.1, 144, 549, 557, 559, 560, 562; 264/328.8
See application file for complete search history.

(56) References Cited

U.S. PATENT DOCUMENTS

| 4,108,956 | A | 8/1978 | Lee |
| 4,497,621 | A | 2/1985 | Kudert et al. |
| 4,518,344 | A | 5/1985 | Latreille et al. |
| 4,525,134 | A | 6/1985 | McHenry et al. |
| 4,526,821 | A | 7/1985 | McHenry et al. |
| 4,550,043 | A | 10/1985 | Beck |
| 4,717,324 | A * | 1/1988 | Schad et al. ............ 425/130 |
| 4,775,308 | A | 10/1988 | Schad et al. |
| 4,781,954 | A | 11/1988 | Krishnakumar et al. |
| 4,863,369 | A | 9/1989 | Schad et al. |
| 4,863,665 | A | 9/1989 | Schad et al. |

(Continued)

FOREIGN PATENT DOCUMENTS

EP        0374247 A1    6/1990

(Continued)

OTHER PUBLICATIONS

International Search Report for Application No. PCT/US05/24101, dated Jun. 28, 2006.

*Primary Examiner*—Tim Heitbrink
(74) *Attorney, Agent, or Firm*—Lahive & Cockfield, LLP

(57) ABSTRACT

Disclosed herein are methods and systems for forming a plurality of multiple layer plastic articles. The methods and systems utilize shooting pot technology in combination with a combination of thermal control elements and in some instances, specialized flow bore geometries to control a thermal property and a flow parameter of selected polymeric material flowing through the system to mold the plurality of multiple layer plastic articles. Both the systems and methods are well suited for use to perform simultaneous flow injection or sequential flow injection to form the plurality of multiple layer plastic articles. The systems and methods described therein beneficially reduce the mold cavity pitch size for multiple layer molds used with systems having shooting pot technology to a mold cavity pitch size found on conventional monolayer molds to provide a plurality of multiple layer plastic articles having a cost similar to monolayer plastic articles.

38 Claims, 13 Drawing Sheets

U.S. PATENT DOCUMENTS

| | | | |
|---|---|---|---|
| 4,950,143 A | 8/1990 | Krishnakumar et al. |
| 5,098,274 A | 3/1992 | Krishnakumar et al. |
| 5,131,830 A | 7/1992 | Orimoto et al. |
| 5,143,733 A | 9/1992 | Von Buren et al. |
| 5,232,710 A | 8/1993 | Miyazawa et al. |
| 5,510,065 A | 4/1996 | McFarlane |
| 5,556,582 A | 9/1996 | Kazmer |
| 5,662,856 A | 9/1997 | Wunderlich |
| 5,772,933 A | 6/1998 | Kotzab |
| 5,833,899 A | 11/1998 | Wunderlich |
| 5,914,138 A | 6/1999 | Swenson |
| 5,972,258 A | 10/1999 | Sicilia |
| 6,062,846 A | 5/2000 | Kalemba |
| 6,063,325 A | 5/2000 | Nahill et al. |
| 6,099,780 A | 8/2000 | Gellert |
| 6,187,241 B1 | 2/2001 | Swenson |
| 6,276,914 B1 | 8/2001 | Sicilia |
| 6,305,923 B1 | 10/2001 | Godwin et al. |
| 6,309,207 B1 | 10/2001 | Kalemba |
| 6,341,954 B1 | 1/2002 | Godwin et al. |
| 6,350,401 B1 | 2/2002 | Gellert et al. |
| 6,428,727 B1 | 8/2002 | Rees |
| 6,440,350 B1 | 8/2002 | Gellert et al. |
| 6,596,213 B2 | 7/2003 | Swenson |
| 2001/0011415 A1 | 8/2001 | Kalemba |
| 2002/0140131 A1 | 10/2002 | Ouellette |
| 2002/0155236 A1 | 10/2002 | Cahill et al. |
| 2002/0182285 A1 | 12/2002 | Godwin et al. |
| 2002/0192401 A1 | 12/2002 | Swenson |

FOREIGN PATENT DOCUMENTS

| | | |
|---|---|---|
| EP | 0688651 A1 | 12/1995 |
| EP | 0768163 A1 | 4/1997 |

* cited by examiner

MULTILAYER MOLDING USING TEMPERATURE ADJUSTMENT OF FLOW RATE IN CONJUNCTION WITH SHOOTING POT TECHNOLOGY

RELATED APPLICATIONS

This application claims the benefit of U.S. Provisional Patent Application No. 60/586,151 filed Jul. 7, 2004, and entitled Multilayer Molding Using Temperature Adjustment Of Flow Rate In Conjunction With Shooting Pot Technology.

FIELD OF INVENTION

The present invention relates to injecting multiple polymeric materials into a number of mold cavities, and more particularly, to injecting multiple polymeric materials into a number of mold cavities with precise distribution of a first and second polymeric material.

BACKGROUND OF THE INVENTION

Conventional sequential injection systems and processes inject polymeric materials one at a time in a predefined sequence to create plastic articles having a five layer structure. One conventional sequential injection process might have three phases, the first injects a first polymeric material, the second injects a second polymeric material, and the third injects a third polymeric material. For this sequential injection process, the quantity of skin material in the first shot determines the location of the leading edge or start of the second material in the final part and the quantity of material in the second shot determines the quantity of second material in the final part. When creating plastic articles on a multi-cavity system it is important to control the polymeric material flow entering each cavity so that each cavity creates a nearly identical article. This is particularly true for the first and second phases of a sequential process.

Simultaneous injection systems inject multiple polymeric materials at the same time to create plastic articles having a three layer structure. A typical simultaneous injection process might have three phases, the first injects a first polymeric material, the second injects a first and second polymeric material, and the third injects only the first polymeric material. For a simultaneous injection process, the quantity of polymeric material in the first phase determines the location of the leading edge of the second polymeric material into a cavity. During the second phase the relative volumetric flow rates of the first and second polymeric materials determine the thickness of the second polymeric material. When creating plastic articles on a multi-cavity system it is important to control the polymeric material flow entering each cavity so that each cavity creates a nearly identical article. This is particularly true for the first and second polymeric materials to enter the cavity during the first and second phases of a simultaneous injection process.

Those skilled in the art understand that nozzle design interacts with injection process and can also appreciate that other injection processes are possible but each requires control over at least some aspects of the first and second polymeric materials in order to create a multilayer plastic article with the correct layer position and thickness.

Currently, injection systems exist that use shooting pots to control the flow of a first and second polymeric material, but they are too large to meet current industry standards for cavity density. Other injection systems also exist that use thermal balancing on the first polymeric material but not for the second polymeric material.

While shooting pots do precisely meter and feed mold cavities with polymeric materials, a further drawback to their use is they are relatively large pieces of equipment to incorporate into an injection mold system and create a space constraint. This space constraint has been a limitation to making preform molds having the same size and configuration as the most compact molds used to make monolayer preforms.

Consequently, the larger mold sizes needed for multilayer preform molds using shooting pot technology requires systems larger than those needed by monolayer preform molds. As a result, conventional shooting pot technology multilayer preform molds have only ⅓ the number of cavities of the largest monolayer preform molds.

In order to provide multilayer preforms having a cost competitive with monolayer preforms it is desirable to produce multilayer preform molds in the same size and configuration as monolayer preform molds using shooting pot technology. Thus, for a sequential injection process, a method of accurately controlling the flow rate and volume of the first material into the cavity without using shooting pot technology on the first and second material is desirable in order to achieve cavity-to-cavity variations of the first and second material on the order of +/−6%.

Hence, there exists a need to improve upon the shooting pot technology used to control the injection of a first and second material.

SUMMARY OF THE INVENTION

The present invention provides methods and systems to mold multiple layer plastic articles using shooting pot technology in combination with various thermal flow balancing technologies or various thermal property distribution technologies, or both, to control the flow of selected polymeric materials from respective material sources to a number of mold cavities. The present invention allows for shooting pots to be used in combination with thermal techniques or thermal techniques to be used on both the first and second polymeric materials with or without shooting pots in order to precisely control the distribution of a first and second polymeric material to allow both the layer location and thickness to be controlled in the molded article while meeting the current industry standards for mold cavity density. The methods and systems are well suited for use to fill a number of mold cavities with a number of polymeric materials to mold plastic articles having a three-layer construction, a four-layer construction, a five-layer construction, and so on. Further, the methods and systems are well suited for use to fill a number of mold cavities with a number of polymeric materials in a sequential manner or to fill a number of mold cavities with a number of polymeric materials in a simultaneous manner.

In one embodiment of the present invention, a system for injection molding a plurality of multiple layer plastic articles is disclosed. The system includes a mold having a plurality of cavities to mold a plurality of multiple layer plastic articles, a first material source to supply a first polymeric material for use in forming at least one layer of each of the plurality of multiple layer plastic articles, and a second material source to supply a second polymeric material for use in forming at least one layer of each of the plurality of multiple layer plastic articles. The system includes a plurality of nozzles in communication with a portion of the mold to inject the first and second polymeric materials into each of the plurality of cavities and includes a plurality of shooting pots. Each of the plurality of shooting pots has an ingress port to receive the first polymeric material, a reservoir to hold a volume of the first polymeric material, and an egress port to feed there through a selected volume of the first polymeric material held by the reservoir. Each shooting pot can be actuated to deliver a controlled volume shot by precisely controlling the total volume and can control the volumetric flow rate of the material passing through the egress port during a shot.

The system includes a first set of flow channels configured to distribute the first polymeric material from the first material source to the ingress port of each of the plurality of shooting pots, a second set of flow channels configured to distribute the first polymeric material from the egress port of each of the plurality of shooting pots to each of the plurality of nozzles to feed each of the plurality of nozzles with a controlled volume shot of the first polymeric material, and a third set of flow channels configured to distribute the second polymeric material from the second material source to each of the plurality of nozzles. A plurality of thermal control elements included with the system are configured to cooperatively control a temperature component of a portion of the system through which the second polymeric material flows. The temperature component of the portion of the system being controllable to control a thermal property and a flow parameter of the second polymeric material flowing through the portion of the system to provide a material flow stream of the second polymeric material at an outlet of each of the plurality of nozzles having a substantial uniform flow parameter.

The first polymeric material supplied by the first material source is used by the system to form an inner layer, an interior layer, or an outer layer of each of the plurality of multiple layer plastic articles. The second polymeric material supplied by the second material source is used by the system to form an inner layer, an interior layer, or an outer layer of each of the plurality of multiple layer plastic articles.

In one embodiment of the present invention, the plurality of shooting pots and the plurality of nozzles have a one to one relationship.

In another embodiment of the present invention, the plurality of shooting pots in combination with the plurality of nozzles includes, a first group of nozzles, a second group of nozzles, a first shooting pot, and a second shooting pot. The first group of nozzles are in communication with a first portion of the mold to inject the first and second polymeric materials into the plurality of cavities associated with the first portion of the mold. The second group of nozzles are in communication with a second portion of the mold to inject the first and second polymeric materials into the plurality of cavities associated with the second portion of the mold. The first shooting pot has an ingress port to receive the first polymeric material, a reservoir to hold a volume of the first polymeric material, and an egress port to feed there through a selected volume of the first polymeric material held by the reservoir to feed each nozzle forming the first group of nozzles with a controlled volume shot of the second polymeric material. The second shooting pot has an ingress port to receive the first polymeric material, a reservoir to hold a volume of the first polymeric material, and an egress port to feed there through a selected volume of the first polymeric material held by the reservoir to each nozzle forming the second group of nozzles with a controlled volume shot of the first polymeric material.

In one embodiment of the present invention, the system sequentially injects the first polymeric material and the second polymeric material into each of the plurality of mold cavities to mold the plurality of multiple layer plastic articles. In another embodiment of the present invention, the system simultaneously injects the first polymeric material and the second polymeric material into each of the plurality of mold cavities to mold the plurality of multiple layer plastic articles.

The plurality of thermal control elements are associated with the plurality of nozzles to control a temperature component of each of the plurality of nozzles. Each of the plurality of thermal control elements being individually controllable to individually control the temperature component of each of the plurality of nozzles to control the thermal property and the flow parameter of at least the second polymeric material through each of the plurality of nozzles. Alternatively, the plurality of thermal control elements are associated with a group of nozzles selected from the plurality of nozzles to control a temperature component of the group of nozzles as a group. The plurality of thermal control elements being controllable as a group to control the temperature component of the group of nozzles to control the thermal property and the flow parameter of at least the second polymeric material flowing through the group of nozzles.

In one aspect of the present invention, the plurality of thermal control elements are associated with each channel member of the third set of flow channels to control a temperature component of each channel member. Each of the plurality of thermal control elements being individually controllable to individually control the temperature component of each channel member of the third set of flow channels to control the thermal property and the flow parameter of the second polymeric material through each channel member forming the third set of flow channels.

In another aspect of the present invention, the plurality of thermal control elements are associated with a group of channel members selected from the third set of flow channels to control a temperature component of the selected channel members as a group. The plurality of thermal control elements being controllable as a group to control the temperature component of the group of selected channel members to control the thermal property and the flow parameter of the second polymeric material through the group of selected channel members.

The plurality of thermal control elements can include elements selected from a heater element, a cooling element, an insulator element, or a thermal conduction element.

The third set of flow channels can include, a plurality of flow channels configured to distribute a shear heated portion of the second polymeric material amongst the plurality of channels to feed each of the plurality of nozzles with a material flow of the second polymeric material from the second material source. Each material flow of the second polymeric material having a substantially uniform flow rate and a substantially uniform distribution of the shear heated second polymeric material at an ingress port of each of the plurality of nozzles.

In another embodiment of the present invention, a system for injection molding a plurality of multiple layer plastic articles, is disclosed. The system includes, a mold, a first material source, a second material source, a plurality of nozzles, a first shooting pot, a second shooting pot, a first set of flow channels, a second set of flow channels, a third set of flow channels, a fourth set of flow channels, and a plurality of thermal control elements.

The mold includes a plurality of cavities to mold a plurality of multiple layer plastic articles. The first material source supplies a first polymeric material for use in forming at least one layer of each of the plurality of multiple layer plastic articles. The second material source supplies a second polymeric material for use in forming at least one layer of each of the plurality of multiple layer plastic articles. The plurality of nozzles are in communication with the mold to inject the first and second polymeric materials into the plurality of cavities.

The first shooting pot has an ingress port to receive the first polymeric material, a reservoir to hold a volume of the first polymeric material, and an egress port to feed there through a selected volume of the first polymeric material held by the reservoir. The second shooting pot has an ingress port to receive the second polymeric material, a reservoir to hold a volume of the second polymeric material, and an egress port to feed there through a selected volume of the second polymeric material held by the reservoir to feed each of the plurality of nozzles with a controlled volume shot of the second polymeric material.

The first set of flow channels is configured to distribute the first polymeric material from the first material source to the ingress port of the first shooting pot. The second set of flow channels is configured to distribute the first polymeric material from the egress port of the first shooting pot to each of the plurality of nozzles to feed each of the plurality of nozzles with a controlled volume shot of the first polymeric material. The third set of flow channels is configured to distribute the second polymeric material from the second material source to the ingress port of the second shooting pot. The fourth set of flow channels is configured to distribute the second polymeric material from the egress port of the second shooting pot to each of the plurality of nozzles to feed each of the plurality of nozzles with a volume shot of the second polymeric material.

The plurality of thermal control elements are configured to cooperatively control a temperature component of a portion of the system through which at least one of the first and second polymeric materials flows. The temperature component of the portion of the system is controllable to control a thermal property and a flow parameter of at least one of the first and second polymeric materials flowing through the portion of the system to provide a material flow stream of at least one of the first and second polymeric materials at an outlet of each of the plurality of nozzles having a substantial uniform flow parameter.

The system can use the first polymeric material to form an inner layer, an interior layer, or an outer layer of each of the plurality of multiple layer plastic articles. The system can use the second polymeric material to form an inner layer, an interior layer, or an outer layer of each of the plurality of multiple layer plastic articles.

The system can sequentially inject the first polymeric material and the second polymeric material into each of the plurality of mold cavities to mold the plurality of multiple layer plastic articles. Alternatively, the system can simultaneously inject the first polymeric material and the second polymeric material into each of the plurality of mold cavities to mold the plurality of multiple layer plastic articles.

In one aspect of the present invention, the plurality of thermal control elements are associated with the plurality of nozzles to control a temperature component of each of the plurality of nozzles. Each of the plurality of thermal control elements being individually controllable to individually control the temperature component of each of the plurality of nozzles to control the thermal property and the flow parameter of at least one of the first and second polymeric materials flowing through each of the plurality of nozzles.

In another aspect of the present invention, the plurality of thermal control elements are associated with a group of nozzles selected from the plurality of nozzles to control a temperature component of the selected nozzles as a group. The plurality of thermal control elements being controllable as a group to control the temperature component of the group of nozzles to control the thermal property and the flow parameter of at least one of the first and second polymeric materials flowing through the group of nozzles.

In another aspect of the present invention, the plurality of thermal control elements are associated with each channel member of the second set of flow channels to control a temperature component of each channel member. Each of the plurality of thermal control elements being individually controllable to individually control the temperature component of each channel member of the second set of flow channels to control the thermal property and the flow parameter of the first polymeric material through each channel member forming the second set of flow channels.

In one aspect of the present invention, the plurality of thermal control elements are associated with selected channel members of the second set of flow channels to control a temperature component of the selected channel members as a group. The plurality of thermal control elements being controllable as a group to control the temperature component of the group of selected channel members to control the thermal property and the flow parameter of the first polymeric material through the group of selected channel members.

In one aspect of the present invention, the plurality of thermal control elements are associated with each channel member of the fourth set of flow channels to control a temperature component of each channel member. Each of the plurality of thermal control elements being individually controllable to individually control the temperature component of each channel member of the fourth set of flow channels to control the thermal property and the flow parameter of the second polymeric material through each channel member forming the fourth set of flow channels.

In another aspect of the present invention, the plurality of thermal control elements are associated with selected channel members of the fourth set of flow channels to control a temperature component of the selected channel members as a group. The plurality of thermal control elements being controllable as a group to control the temperature component of the group of selected channel members to control the thermal property and the flow parameter of the second polymeric material through the group of selected channel members.

The plurality of thermal control elements can include elements selected from a heater element, a cooling element, an insulator element, or a thermal conduction element.

The second set of flow channels can include, a plurality of flow channels configured to distribute a shear heated portion of the first polymeric material amongst the plurality of channels to feed each of the plurality of nozzles with a material flow of the first polymeric material from the first shooting pot. Each material flow of the first polymeric material having a substantially uniform flow rate and a substantially uniform distribution of the shear heated second polymeric material at an ingress port of each of the plurality of nozzles.

The fourth set of flow channels can include a plurality of flow channels configured to distribute a shear heated portion of the second polymeric material amongst the plurality of channels to feed each of the plurality of nozzles with a material flow of the second polymeric material from the second shooting pot. Each material flow of the second polymeric material having a substantially uniform flow rate and a substantially uniform distribution of the shear heated second polymeric material at an ingress port of each of the plurality of nozzles.

In one embodiment of the present invention, a system for injection molding a plurality of multiple layer plastic articles is disclosed. The system includes a mold, a first material source, a second material source, a plurality of nozzles, a first set of flow channels, a second set of flow channels, a first plurality of thermal control elements, and a second plurality of thermal control elements.

The mold includes a plurality of cavities to mold a plurality of multiple layer plastic articles. The first material source supplies a first polymeric material for use in forming at least one layer of each of the plurality of multiple layer plastic articles. The second material source supplies a second polymeric material for use in forming at least one layer of each of the plurality of multiple layer plastic articles. The plurality of nozzles are in communication with a portion of the mold to inject the first and second polymeric materials into each of the plurality of cavities.

The first set of flow channels is configured to distribute the first polymeric material from the first material source to each of the plurality of nozzles. The second set of flow channels is configured to distribute the second polymeric material from the second material source to each of the plurality of nozzles.

The first plurality of thermal control elements are configured to cooperatively adjust a temperature component of the first set of flow channels. The temperature component of the first set of flow channels being adjustable by the first plurality of thermal control elements to control a thermal property and a flow parameter of the first polymeric material through the first set of flow channels to provide a material flow stream of the first polymeric material at an outlet of each of the plurality of nozzles having a substantial uniform flow parameter.

The second plurality of thermal control elements are configured to cooperatively adjust a temperature component of the second set of flow channels. The temperature component of the second set of flow channels being adjustable by the second plurality of thermal control elements to control a thermal property and a flow parameter of the second polymeric material through the second set of flow channels to provide a material flow stream of the second polymeric material at an outlet of each of the plurality of nozzles having a substantial uniform flow parameter.

In one embodiment of the present invention, there is disclosed a system for injection molding a plurality of multiple layer plastic articles. The system includes a mold, a first material source, a second material source, a plurality of nozzles, a plurality of shooting pots, a first plurality of flow channels, a second plurality of flow channels, and a third plurality of flow channels.

The mold includes a plurality of cavities to mold a plurality of multiple layer plastic articles. The first material source supplies a first polymeric material for use in forming at least one layer of each of the plurality of multiple layer plastic articles. The second material source supplies a second polymeric material for use in forming at least one layer of each of the plurality of multiple layer plastic articles. The plurality of nozzles are in communication with a portion of the mold to inject the first and second polymeric materials into each of the plurality of cavities.

Each of the plurality of shooting pots has an ingress port to receive at least the first polymeric material, a reservoir to hold a volume of the first polymeric material, and an egress port to feed there through a selected volume of the first polymeric material held by the reservoir to feed each of the plurality of nozzles with a controlled volume shot of the first polymeric material.

The first plurality of flow channels are configured to distribute a shear heated portion of the second polymeric material amongst the plurality of channels to feed each of the plurality of nozzles with a material flow of the second polymeric material from the second material source. Each material flow of the second polymeric material having a substantially uniform flow rate and a substantially uniform distribution of the shear heated second polymeric material at an ingress port of each of the plurality of nozzles.

The second plurality of flow channels are configured to distribute the first polymeric material from the first material source to the ingress port of each of the plurality of shooting pots, and the third plurality of flow channels are configured to distribute the first polymeric material from the egress port of each of the plurality of shooting pots to each of the plurality of nozzles to feed each of the plurality of nozzles with the controlled volume shot of the first polymeric material from a related shooting pot.

It is one object of the present invention to provide a method and system to accurately feed a first polymeric material into each mold cavity by adjusting the thermal properties of the first polymeric material to precisely control its flow rate and flow volume while using shooting pot technology to meter and feed a second polymeric material into each mold cavity.

Another object of the present invention is, by using one shooting pot per cavity, to construct a multilayer preform mold having the similar number of cavities, cavity spacing, and configuration as a monolayer mold, and to do so up to and including the largest monolayer molds.

Another object of the present invention is to use shooting pots to feed multiple cavities rather than pairing a single shooting pot feed with a single cavity.

Another object of the present invention is to use adjustment of the thermal properties of a first polymeric material, a second polymeric material, or both, to allow the appropriate control of the leading edge position of the second material within the first material while using shooting pot technology on either material.

In one embodiment of the present invention, systems and methods disclosed herein adjust the flow properties of the first polymeric material so that the same volume of first polymeric material flows into each of the multiple cavities of the mold.

One embodiment of the present invention uses temperature adjustment of the first polymeric material flowing to each cavity to adjust the relative flow rate of the first polymeric material flow stream feeding each cavity. For example, an embodiment of the present invention uses the change in flow viscosity as temperature changes to affect the desired flow rate into each cavity.

In another embodiment of the present invention, a system and method is disclosed for injection molding a plurality of multiple layer plastic articles includes a manifold system to feed a first polymeric material to each nozzle feeding a mold cavity and to feed a second polymeric material to each said nozzle feeding each mold cavity; each of the materials has its own set of flow channels within the manifold system, and the system can include multiple separate manifold blocks, each having independent or collective temperature control.

In one embodiment of the present invention, there is disclosed a system and method of adjusting the temperature of a first polymeric material flow stream along different portions of a flow channel path from the source of the first polymeric material to each cavity; the temperature of the first polymeric material may be adjusted in the manifold blocks, in each of the nozzles, or both to accurately adjust the flow rate and volume of the first polymeric material entering each cavity of a mold.

In another embodiment of the present invention, there is disclosed a system and method of adjusting the temperature of the manifold blocks feeding different groups of mold cavities relative to other groups of mold cavities to adjust the temperature of the first polymeric material flowing through each of the manifold blocks, thereby collectively affecting the temperature of the first polymeric material flowing to a specific group of mold cavities fed by specific manifold blocks.

In one embodiment of the present invention, there is disclosed a system and method of individually adjusting the temperature of a nozzle in a system for injection molding a plurality of multiple layer plastic articles to individually affect the temperature of the first polymeric material flowing to a specific cavity.

Another embodiment of the present invention includes a system and method of collectively adjusting the temperature of a group of nozzles to collectively affect the temperature of a first polymeric material flowing to a group of mold cavities.

Another embodiment of the present invention discloses a method of adjusting in a system for injection molding a plurality of multiple layer plastic articles the temperature of specific manifold blocks and specific nozzles as necessary to achieve an accurate flow rate and volume of a first polymeric material into each mold cavity so that the leading edge of a second polymeric material is placed in the appropriate position in each of the articles molded in each and every mold cavity during each and every cycle of the system.

In one embodiment of the present invention, a method and system are disclosed for molding a plurality of plastic articles. The method and system use a first polymeric material source, which is similar to that used for monolayer molding, and controls the flow rate and volume of a first polymeric material into each mold cavity by adjusting the temperature of the appropriate flow channels to each cavity. The method and system can also use a second polymeric material source in communication with a shooting pot for each cavity to accurately meter and feed a second polymeric material in each cavity.

In another embodiment of the present invention, a method and system for molding a plurality of plastic articles are disclosed. The method and system use a first polymeric material source, which is similar to that used for monolayer molding and controls the flow rate and volume of a first polymeric material into each mold cavity by adjusting the temperature of the appropriate flow channels to each cavity. The method and system can use a second polymeric material source in communication with at least one shooting pot for more than one mold cavity, to accurately meter and feed the second polymeric material into each cavity associated with the shooting pot.

Another embodiment of the present invention discloses a method and system that use a first polymeric material source in communication with at least one shooting pot for injecting a first polymeric material into a plurality of mold cavities and for controlling the flow rate and volume of the first polymeric material to each cavity by adjusting the temperature of the flow channels between said shooting pot and the mold cavities through which the first polymeric material flows. The method and system discloses using a second polymeric material source in communication with at least one other shooting pot for injecting a second polymeric material into the plurality of mold cavities.

One embodiment of the present invention discloses a method and system using a first polymeric material source, which is similar to that used for monolayer molding and controlling the flow rate and volume of a first polymeric material into each mold cavity of the system for injection molding a plurality of multiple layer plastic articles. The method and system controls the flow rate and volume by adjusting the temperature of the appropriate flow channels to each cavity. The method and system allows for use of a second polymeric material source in combination with adjustment of the temperature of flow channels in the system through which the second polymeric material flows to accurately control the flow rate and volume of the second polymeric material in each cavity.

Another embodiment of the present invention includes a method and system using a first polymeric material source in communication with at least one shooting pot for each mold cavity of the system for injection molding a plurality of multiple layer plastic articles. The shooting pot accurately feeds and meters a first polymeric material from the first polymeric material source into each cavity. The method and system allows for the use of a second polymeric material source, which is similar to that used for monolayer molding, and adjusts the temperature of appropriate flow channels between the second polymeric material source and the plurality of cavities to control through which the second polymeric material flows to control the flow and volume of the second polymeric material into each of the cavities.

Another embodiment of the present invention discloses in a system for injection molding a plurality of multiple layer plastic articles a method of using a first polymeric material source in communication with at least one shooting pot for injecting the first polymeric material in more than one cavity and controlling the flow rate and volume of the first polymeric material to each cavity by adjusting the temperature of the flow channels between said shooting pot and the mold through which the first polymeric material flows. The disclosed method can use a second polymeric material source, which is similar to that used for monolayer molding, and adjust the temperature of appropriate flow channels between the second polymeric source through which the second polymeric material flows and each mold cavity to control the flow and volume of the second polymeric material into each cavity.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DETAILED DESCRIPTION

Figure 1:
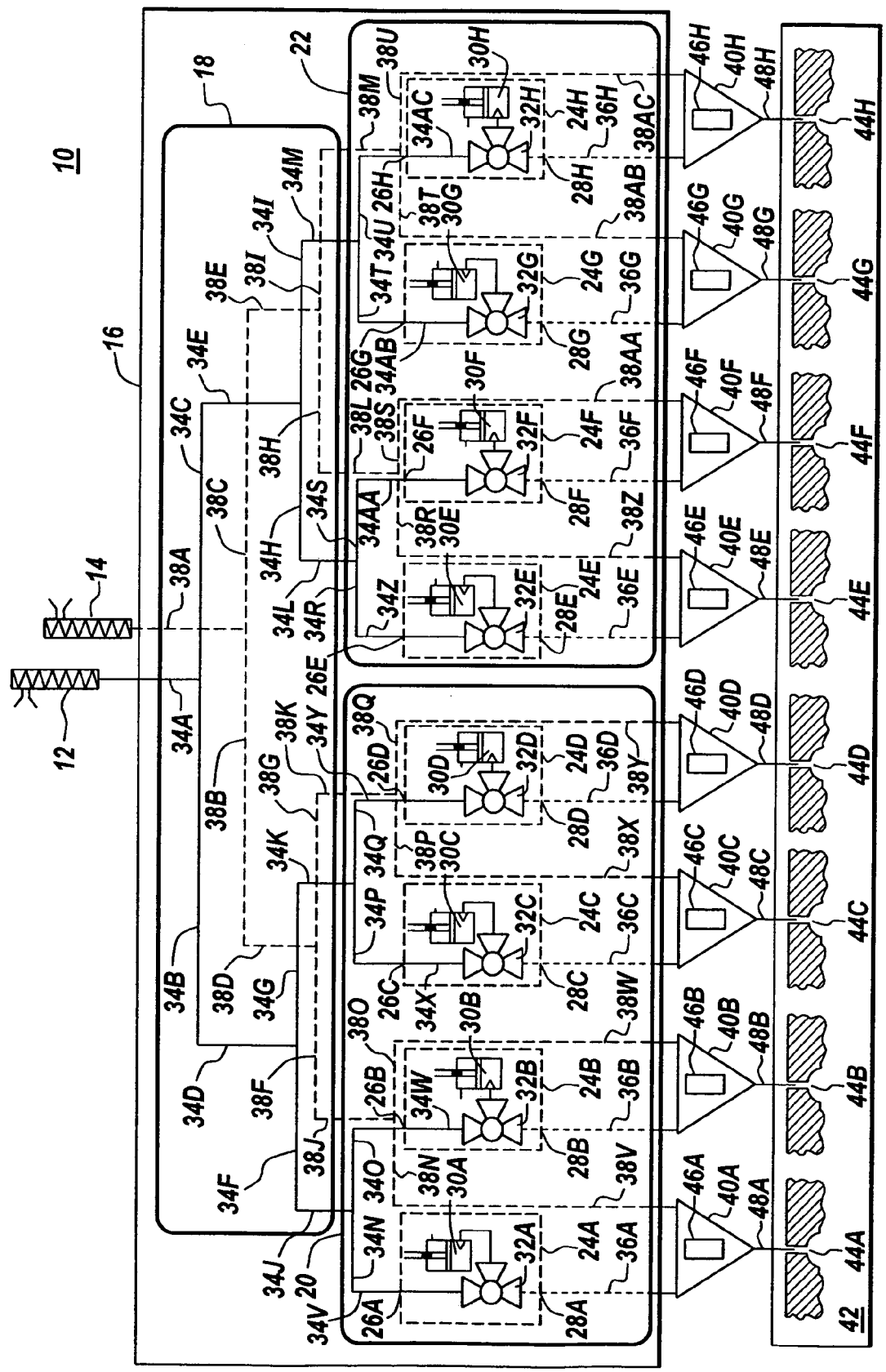
FIG. 1 depicts a system for injection molding a plurality of multiple layer plastic articles using a plurality of shooting pots in combination with a thermal balancing technique in accordance with the teachings of the present invention.

The present invention provides methods and systems to mold multiple layer plastic articles using shooting pot technologies in combination with various thermal flow balancing technologies of polymeric materials, various thermal property distribution technologies of polymeric materials, or both, to control the flow of selected polymeric materials from respective material sources to a number of mold cavities. The methods and systems are well suited for use to fill a number of mold cavities with a number of polymeric materials to mold plastic articles having a three-layer construction, a four-layer construction, a five-layer construction, and so on. Further, the methods and systems are well suited for use to fill a number of mold cavities with a number of polymeric materials in a sequential manner or to fill a number of mold cavities with a number of polymeric materials in a simultaneous manner, or both.

An exemplary injection molding system suitable for practicing the present invention is configured to inject at least two polymeric materials into a plurality of mold cavities. Materials suitable for use with the present invention include polymer based materials such as, polyethylene terephthalate (PET), ethylene vinyl alcohol (EVOH), polycarbonates, nylon, polypropylene, and the like. Each injection molding system disclosed herein can include, amongst other features, one or more controllers used to control various hardware and software components of the system, a first material source, a second material source, and a manifold. Each exemplary injection molding system can further includes a plurality of nozzle assemblies and a mold. The mold includes a plurality of gates and a plurality of cavities. Those skilled in the art will appreciate that the number of cavities in the mold can range from one cavity to one hundred forty-four (144) cavities or more, and have a cavity pitch sizing of about 50 mm.

Before continuing with detailed description it is first helpful to define the term "thermal control element" as used throughout. The term "thermal control element" as used herein, refers to a device that transfers heat to or from a component or feature associated with the thermal control element. The thermal control element can be associated with other elements such as a sensor, and a controller or microprocessor to provide active feedback and control of the thermal control element and, in turn, the feature or component associated with the thermal control element. Examples of suitable thermal control elements for use with the present invention, include, but are not limited to, a heater, an insulator such as an air gap, or a unit of material having a thermal transfer characteristic different from the thermal transfer characteristic of the feature or component associated with the insulator, a cooling element, such as a channel carrying a fluid to transfer heat to or from the component or feature associated with the cooling element, and a thermal conduction element, such as a heat pipe. The different types of thermal control elements can be used individually or combined in any manner to provide thermal control of a component or feature of a system for injecting molding a plurality of multiple layer plastic articles. The thermal control elements can be controlled individually or ganged to form a group and controlled as a group.

FIG. 1 illustrates an exemplary system for injection molding a number of multiple layer plastic articles in accordance with teachings of the present invention. The system 10 includes a first material source 12, a second material source 14, a manifold system 16, nozzles 40A-40H, a mold 42, and a number of thermal control elements 46A-46H. The first material source 12 supplies a first polymeric material and the second material source 14 supplies a second polymeric material to the manifold system 16, the nozzles 40A-40H, and, in turn, the mold 42, for use in forming a plurality of multiple layer plastic articles. Mold 42 includes cavities 44A-44H for use in molding multiple layer plastic articles.

The manifold system 16 can be configured as one monolithic unit formed from a single block of material or configured as multiple units formed from multiple blocks of material that are cooperatively engaged using various fastening techniques. For example, manifold system 16 can include a first manifold portion 18, a second manifold portion 20, and a third manifold portion 22 cooperatively engaged to deliver from the first material source 12 and the second material source 14 at least two polymeric material flow streams to each of the nozzle assemblies 40A-40H. The manifold system 16 is also configured to include shooting pots 24A-24H for use in injecting the first polymeric material into cavities 44A-44H of the mold 42. Those skilled in the art will appreciate mold 42 is shown having eight cavities for illustrative purposes and those skilled in the art will recognize that mold 42 can include many more cavities, such as 32, 48, 72, 96, 144 cavities or more.

Each of the shooting pots 24A-24H include a respective ingress port 26 to receive the first polymeric material from the first material source 12, a reservoir 30 to hold a volume of the first polymeric material, and an egress port 28 to feed there through a selected volume of the first polymeric material to a respective one of the nozzles 40A-40H. Those skilled in the art will appreciate the shooting pots 24A-24H can take a number of configurations. For example, as illustrated in FIG. 1 each of the shooting pots 24A-24H include a valve 32 in line with a material flow from the first material source 12 and a respective one of the nozzles 40A-40H. Valve 32 directs a material flow from the first material source 12 into a respective reservoir 30 and, as necessary, blocks the flow path from the first material source and couples the respective reservoir 30 to a flow path leading to an associated one of the nozzles 40A-40H. Those skilled in the art will appreciate other shooting pot configurations are suitable for use with the present invention, for example shooting pots with other valve configurations or shooting pots with no valve assembly.

Manifold system 16 includes a first set of flow channels 34A-34AC configured to distribute a material flow of the first polymeric material from the first material source 12 to ingress ports 26A-26H of the shooting pots 28A-28H. Further, the manifold system 16 includes a second set of flow channels 36A-36H configured to distribute and feed a controlled volume shot of the first polymeric material from the reservoirs 30A-30H through egress ports 28A-28H of each of the shooting pots 24A-24H to a first ingress port of each of the nozzles 40A-40H. The manifold system 16 includes a third set of flow channels 38A-38AC configured to distribute a material flow of the second polymeric material from the second material source 14 to a second ingress port of each of the nozzles 40A-40H.

Associated with each of the nozzles 40A-40H is one of the thermal control elements 46A-46H. The thermal control elements 46A-46H are configured to cooperatively control a temperature component of the nozzles 40A-40H to control a thermal property and a flow parameter of one of the first polymeric material, the second polymeric material, or both, flowing through the nozzles to provide a material flow stream of at least the second polymeric material having a substantial uniform flow parameter at an outlet 48 of each of the plurality of nozzles 40A-40H.

The thermal control elements 46A-46H can include at least one of a heater, a cooling element such as, a channel or channels carrying chilled water or other suitable fluid to cool or heat a portion of the system, an insulator element such as, an air gap or a unit of material different the material type abutting the insulator element, the unit of material acting as the insulator element having a thermal transfer property different then the material type it abuts, or a thermal conduction element such as, a heat pipe. Thermal control elements 46A-46H are controllable individually to individually control the temperature component of each of the nozzles 40A-40H or controllable as a group or multiple groups to control the temperature component of a group or group of nozzles. Alternatively, a single thermal control element may effect the material flow in more than one flow channel and therefore control a group of flow channels.

System 10 provides a benefit over prior art systems that use shooting pot technology to inject either a first polymeric material or a second polymeric material, or both into cavities of a mold to form a plurality of multilayer plastic articles. That is, the system 10 combines the use of shooting pot technology with various thermal flow balancing technologies and various thermal property distribution technologies for polymeric material flows to achieve a system and a mold having a plurality of cavities with a pitch size on the order of a pitch size for a mold for molding a plurality of monolayer plastic articles. More specifically, system 10 achieves a cavity-to-cavity variation of the first polymeric material entering each of the mold cavities 44A-44H on the order of +/−5% by weight and achieves a cavity-to-cavity variation of the second polymeric material entering each of the mold cavities 44A-44H on the order of +/−5% by weight.

Further, system 10 can achieve these results by performing either a sequential injection of a skin material using the first polymeric source 12 followed by a core or interior material using the second material source 14 or a simultaneous injection of the skin material using the first polymeric source 12 and the core or interior material using the second material source 14 to provide precise control of the inner and interior layers of a plurality of multiple layer plastic articles formed using the system 10. Moreover, the reduction in the number of shooting pots utilized over the prior art systems in combination with the thermal balancing provided by thermal elements 46A-46H allow the mold 42 to realize a cavity pitch sizing of about 50 mm as compared to a cavity pitch sizing of about 75 mm minimum found in prior art injection molding systems using shooting pot technology without the thermal balancing or thermal distribution techniques of polymeric material taught by the present invention. The use of thermal balancing reduces the number of moving parts and consequently wear-parts by nearly half because thermal balancing can be implemented with no moving parts.

Those skilled in the art will recognize system 10 illustrates a one to one relationship between shooting pots and nozzles. Those skilled in the art will also realize that the shooting pot to nozzle relationship can take the form of a one to many relationship as described below in other embodiments of the present invention. Further, system 10 is well suited for use in forming multiple layer plastic articles having a three-layer construction, a four-layer construction, or a five-layer construction.

Figure 2:
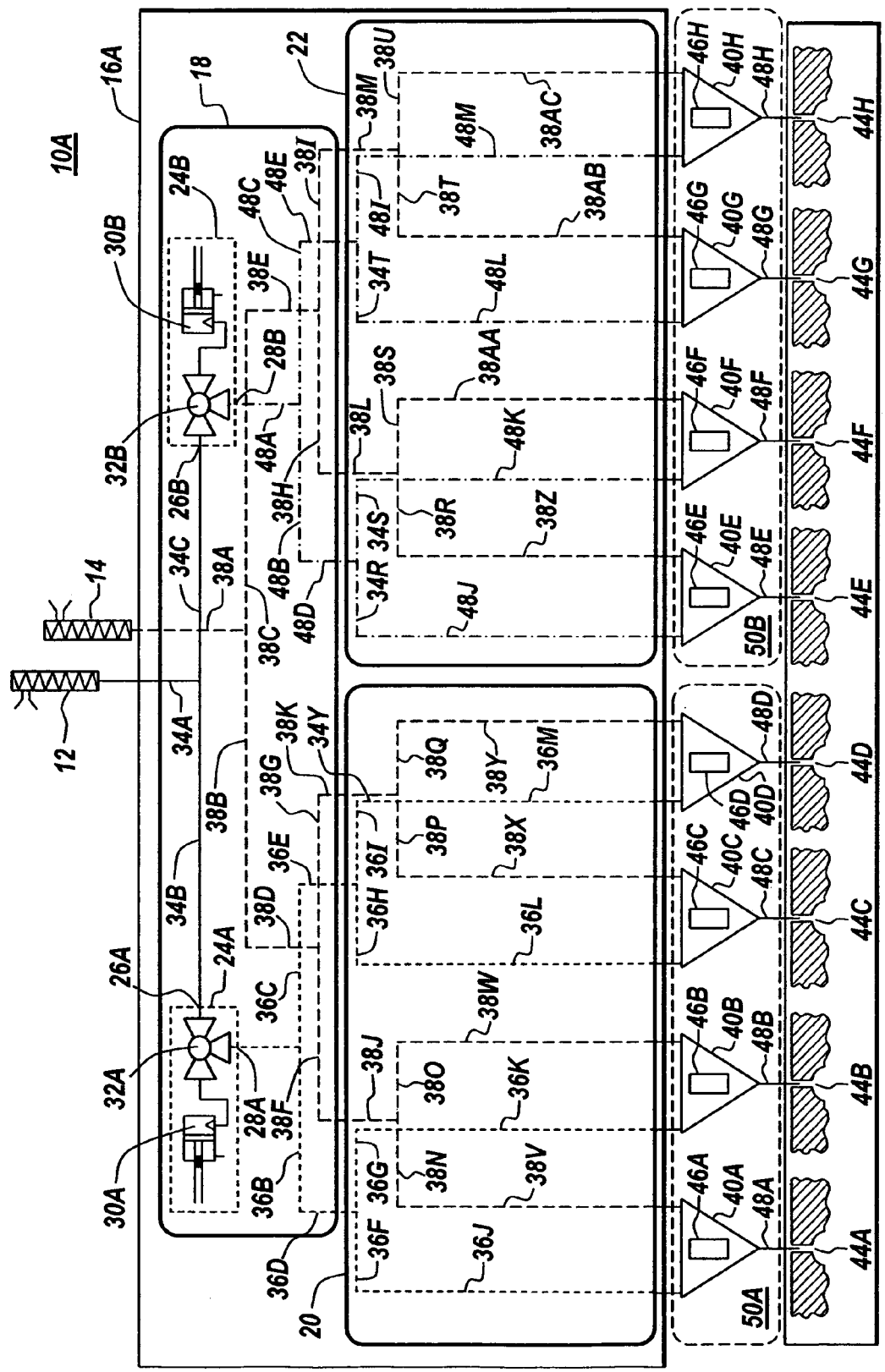
FIG. 2 illustrates a system for injection molding a plurality of multiple layer plastic articles using a plurality of shooting pots in combination with a thermal balancing technique in accordance with the teachings of the present invention.

FIG. 2 illustrates another exemplary system for injection molding a plurality of multiple layer plastic articles in accordance with the teachings of present invention. System 10A includes a first material source 12, a second material source 14, a manifold system 16A, a plurality of nozzles 40A-40H, and a mold 42 having a plurality of cavities 44A-44H to mold a plurality of multiple layer plastic articles. System 10A further includes a first shooting pot 24A and a second shooting pot 24B. Both the shooting pots 24A and 24B are associated with the first material source 12 for use in injecting each of the cavities 44A-44H with a controlled volume shot of a first polymeric material supplied by the first polymeric source 12.

Each of the nozzles 40A-40H are associated with one of the thermal control elements 46A-46H. Thermal control elements 46A-46H are configured to cooperatively control a temperature component of each of the nozzles 40A-40H to control a thermal property and a flow parameter of the first polymeric material, the second polymeric material or both flowing through the nozzles 40A-40H. The association of the thermal control elements 46A-46H with the nozzles 40A-40H allows the system 10A to provide a material flow stream of the first polymeric material, the second polymeric material, or both at outlets 40A-40H of each of the nozzles 40A-40H having a substantial uniform flow parameter. When both materials are being controlled, the thermal control element may independently control two thermal properties that allow independent control of flow properties of each material.

System 10A provides similar benefits and advantages as that of system 10 illustrated in FIG. 1. That is, system 10A reduces the number of shooting pots from a one to one relationship with the plurality of nozzles 40A-40H to a one to many relationship. With the one to many shooting pot to nozzle configuration, the first shooting pot 24A feeds a first group of nozzles 50A and the second shooting pot 24B feeds a second group of nozzles 50B. Those skilled in the art will appreciate the grouping of the nozzles in FIG. 2 is merely illustrative and one shooting pot can feed a group of two nozzles, three nozzles, or more then three nozzles.

Additionally, system 10A includes a first set of flow channels 34A-34C configured to feed the first shooting pot 24A and the second shooting pot 24B through respective ingress ports 26A and 26B with a material flow of the first polymeric material. System 10A includes a second set of flow channels 36A-36M configured to distribute a controlled volume shot of the first polymeric material from reservoir 30A through egress port 28A of the first shooting port 24A to a first ingress port of each of the nozzles forming nozzle group 50A. System 10A includes a third set of flow channels 38A-38AC configured to distribute a material flow of the second polymeric material from the second material source 14 to a second ingress port of each of the nozzles 40A-40H.

System 10A includes a fourth set of flow channels 48A-48M configured to distribute a controlled volume shot of the first polymeric material from reservoir 30B through the egress port 28B of the second shooting pot 24B to a first input port of each of the nozzles forming nozzle group 50B.

In operation, thermal control elements 46A-46H control a temperature component of each of the nozzles 40A-40H to control a thermal property and a flow property of the first polymeric material, the second polymeric material or both flowing through the nozzles 40A-40H to provide a material flow stream of the first polymeric material, the second polymeric material or both having a substantial uniform flow parameter at respective outlets 48A-48H of each of the plurality of nozzles 40A-40H. Thermal control elements 46A-46H are configurable so that each is individually controllable to individually control a temperature component of an associated nozzle or are configurable as a group to control a group of the thermal control elements, which, in turn, control a group of nozzles for example, group 50A, or second group 50B. For example, thermal control elements 46A-46D can be ganged or grouped together to control a temperature component of nozzles 40A-40D as a group. Further, thermal control elements 46E-46H can be configured for individual control a temperature component of each of the nozzles 40E-40H individually. Alternatively, a single thermal control element may effect the material flow in more than one flow channel and therefore control a group of flow channels.

System 10A is well suited to perform either simultaneous injection or sequential flow injection to form a plurality of multiple layer plastic articles having a three-layer, four-layer, or five-layer construction. System 10A provides a benefit over prior art systems that use shooting pot technology to inject either a first polymeric material or a second polymeric material, or both into cavities of a mold to form a plurality of multilayer plastic articles. That is, the system 10A combines the use of shooting pot technology with various thermal flow balancing technologies and various thermal property distribution technologies for polymeric material flows to achieve a system and a mold having a plurality of cavities with a pitch size on the order of a pitch size for a mold for molding a plurality of monolayer plastic articles. More specifically, system 10A achieves a cavity-to-cavity variation of the first polymeric material entering each of the mold cavities 44A-44H on the order of +/−5% by weight and achieves a cavity-to-cavity variation of the second polymeric material entering each of the mold cavities 44A-44H on the order of +/−5% by weight.

Further, system 10A can achieve these results by performing either a sequential injection of a skin material using the first polymeric source 12 followed by a core or interior material using the second material source 14 or a simultaneous injection of the skin material using the first polymeric source 12 and the core or interior material using the second material source 14 to provide precise control of the inner and interior layers of a plurality of multiple layer plastic articles formed using the system 10A. Moreover, the reduction in the number of shooting pots utilized over the prior art systems in combination with the thermal balancing provided by thermal elements 46A-46H allow the mold 42 to realize a cavity pitch sizing of about 50 mm as compared to a cavity pitch sizing of about 75 mm minimum found in prior art injection molding systems using shooting pot technology without the thermal balancing or thermal distribution techniques of polymeric material taught by the present invention. The use of thermal balancing reduces the number of moving parts and consequently wear-parts by nearly half because thermal balancing can be implemented with no moving parts.

Figure 3:
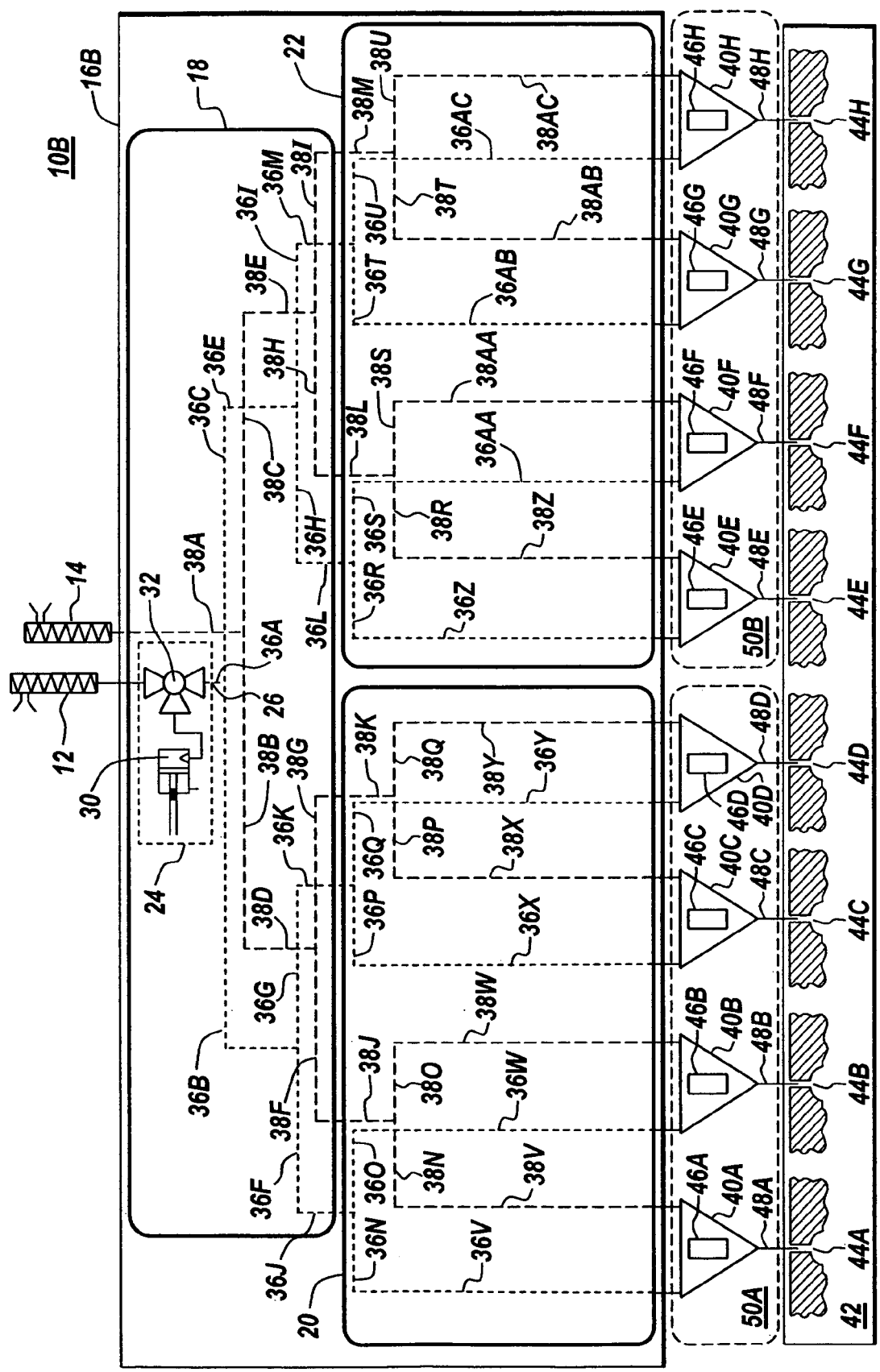
FIG. 3 illustrates a system for injection molding a plurality of multiple layer plastic articles using a single shooting pot in combination with a thermal balancing technique in accordance with the present invention.

FIG. 3 illustrates another exemplary system for injection molding a plurality of multiple layer plastic articles in accordance with the teachings of the present invention. System 10B like system 10 and 10A combines shooting pot technology with polymeric material flow balancing technologies to minimize cavity-to-cavity flow variations on both a first polymeric material and a second polymeric material entering a plurality of cavities. System 10B includes a single shooting pot to feed each of the nozzles 40A-40H with a controlled volume shot of the first polymeric material from the first material source 12.

System 10B includes a first material source 12, a second material source 14, a manifold system 16B, a plurality of nozzles 40A-40H, and a mold 42 having a plurality of cavities 44A-44H to mold a plurality of multiple layer plastic articles. System 10B further includes a shooting pot 24. Shooting pot 24 is associated with the first material source 12 for use in injecting each of the cavities 44A-44H with a controlled volume shot of a first polymeric material supplied by the first polymeric source 12.

System 10B includes thermal control elements 46A-46H associated with nozzles 40A-40H to cooperatively control a temperature component of each of the nozzles 40A-40H. The temperature component of each of the nozzles 40A-40H is controllable by the thermal control elements 46A-46H to control a thermal property and a flow parameter of the first polymeric material, the second polymeric material, or both flowing through the nozzles 40A-40H to provide a material flow stream of the first polymeric material, the second polymeric material, or both having a substantially uniform flow parameter at outlets 48A-48H of each of the nozzles 40A-40H.

In operation, thermal control elements 46A-46H control a temperature component of each of the nozzles 40A-40H to control a thermal property and a flow property of the first polymeric material, the second polymeric material or both flowing through the nozzles 40A-40H to provide a material flow stream of the first polymeric material, the second polymeric material or both having a substantial uniform flow parameter at respective outlets 48A-48H of each of the plurality of nozzles 40A-40H. Thermal control elements 46A-46H are configurable so that each is individually controllable to individually control a temperature component of an associated nozzle or are configurable as a group or groups to control a group or groups of the thermal control elements, which, in turn, control a temperature component of a group or group of nozzles. Alternatively, a single thermal control element may effect the material flow in more than one flow channel and therefore control a group of flow channels.

The manifold system 16B includes a first flow channel 34 configured to deliver a material flow of the first polymeric material from the first material source 12 to an ingress port 26 of the shooting pot 28. The manifold system 16B includes a second set of flow channels 36A-36AC configured to distribute a controlled volume shot of first polymeric material from reservoir 30 through the egress port 28 of the shooting pot 24 to a first ingress port of each of the nozzles 40A-40H. The manifold system 16B includes a third set of flow channels 38A-38AC configured to distribute a material flow of the second polymeric material from the second material source 14 to a second ingress port of each of the nozzles 40A-40H.

System 10B is well suited to perform sequential injection or simultaneous injection of the first and second polymeric materials to mold a plurality of multiple layer plastic articles having a three-layer construction, a four-layer construction, or a five-layer construction. Further, the minimum pitch size of the cavities 44A-44H of the mold 42 are on the order of 50 mm which conforms with the cavity pitch size of molds used for injection molding a plurality of monolayer plastic articles.

System 10B provides a benefit over prior art systems that use shooting pot technology to inject either a first polymeric material or a second polymeric material, or both into cavities of a mold to form a plurality of multilayer plastic articles. That is, the system 10B combines the use of shooting pot technology with various thermal flow balancing technologies and various thermal property distribution technologies for polymeric material flows to achieve a system and a mold having a plurality of cavities with a pitch size on the order of a pitch size for a mold for molding a plurality of monolayer plastic articles. More specifically, system 10B achieves a cavity-to-cavity variation of the first polymeric material entering each of the mold cavities 44A-44H on the order of +/−5% by weight and achieves a cavity-to-cavity variation of the second polymeric material entering each of the mold cavities 44A-44H on the order of +/−5% by weight.

Further, system 10B can achieve these results by performing either a sequential injection of a skin material using the first polymeric source 12 followed by a core or interior material using the second material source 14 or a simultaneous injection of the skin material using the first polymeric source 12 and the core or interior material using the second material source 14 to provide precise control of the inner and interior layers of a plurality of multiple layer plastic articles formed using the system 10B. Moreover, the reduction in the number of shooting pots utilized over the prior art systems in combination with the thermal balancing provided by thermal elements 46A-46H allow the mold 42 to realize a cavity pitch sizing of about 50 mm as compared to a cavity pitch sizing of about 75 mm minimum found in prior art injection molding systems using shooting pot technology without the thermal balancing or thermal distribution techniques of polymeric material taught by the present invention. The use of thermal balancing reduces the number of moving parts and consequently wear-parts by nearly half because thermal balancing can be implemented with no moving parts.

Figure 4:
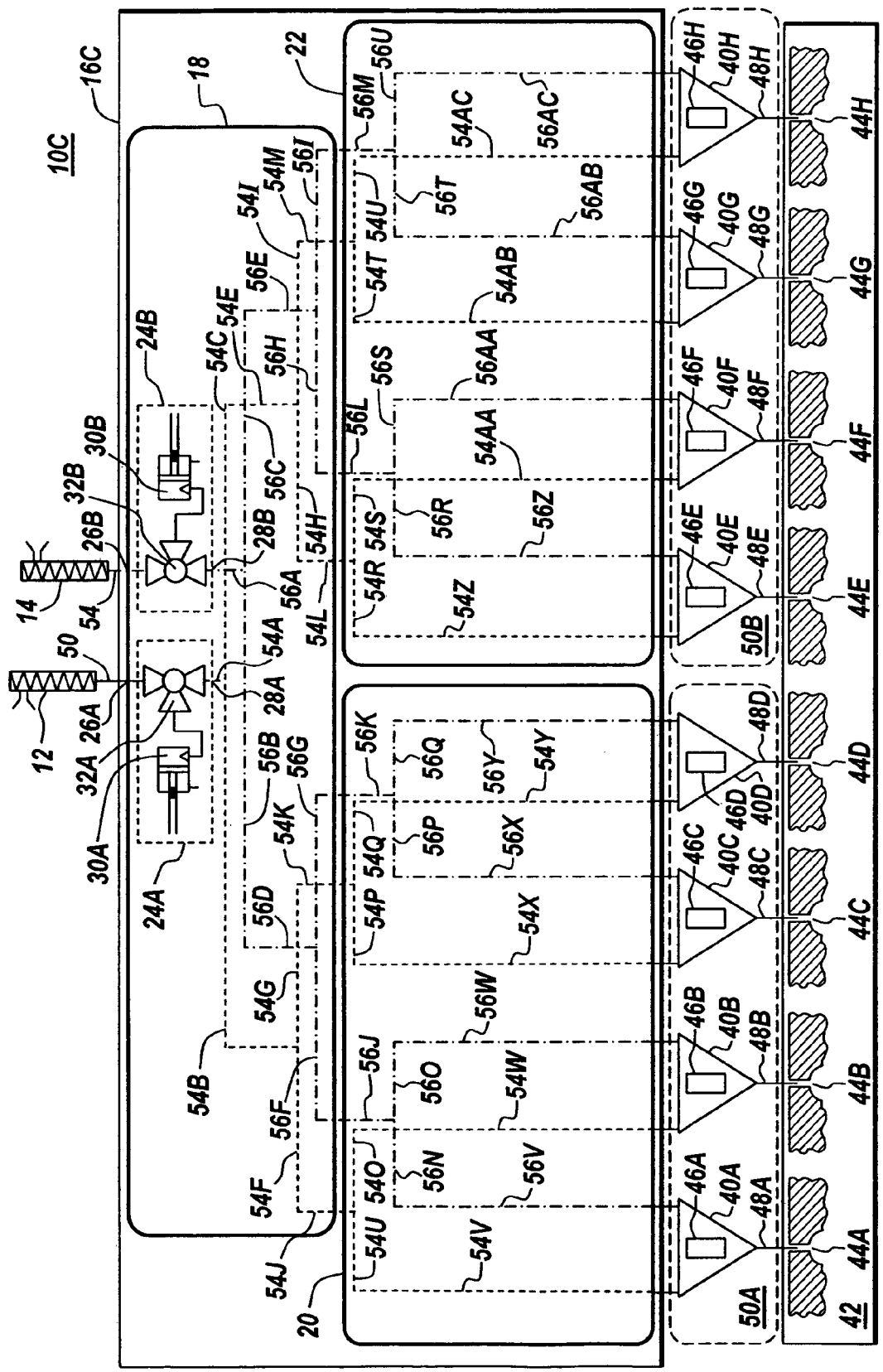
FIG. 4 illustrates another system for injection molding a plurality of multiple layer plastic articles using a plurality of shooting pots in combination with a thermal balancing technique in accordance with the teachings of the present invention.

FIG. 4 illustrates another exemplary system for injection molding a plurality of multiple layer plastic articles in accordance with the teachings of the present invention. System 10C is configured to include a first shooting pot 24A associated with the first material source 12 to deliver a controlled volume shot of the first polymeric material to a first ingress port each of the nozzles 40A-40H. System 10C also includes a second shooting pot 24B to deliver a controlled volume shot of a second polymeric material from the second material source 14 to a second ingress port each of the nozzles 40A-40H.

The system 10C includes a manifold system 16C having a plurality of bores and sub-bores to distribute a material flow of the first polymeric material from the egress port 28A of the shooting pot 24A to the first ingress port of each of the nozzles 40A-40H and to distribute a material flow of the second polymeric material from the egress port 28B of the shooting pot 24B to the second ingress port of each of the nozzles 40A-40H. The system 10C includes a mold 42, and a number of thermal control elements 46A-46H associated with the nozzles 40A-40H.

Manifold system 16C includes a flow channel 50 connecting the first material source 12 to ingress port 26A of the first shooting pot 24A to fill the reservoir 30A with a first polymeric material. Another flow channel 54 of the manifold system 16C couples the second material source 14 with an ingress port 26B of the second shooting pot 24B to fill reservoir 30B with the second polymeric material. A set of flow channels 54A-54AC is configured to distribute a controlled volume shot of the first polymeric material from the reservoir 30A through the egress port 28A of the first shooting pot 24A to a first ingress port of each of the nozzles 40A-48. Another set of flow channels 56A-56AC of manifold system 16C is configured to distribute a controlled volume shot of the second polymeric material from reservoir 30B through the egress port 28D of the second shooting pot 24B to the second ingress port of each of the nozzles 40A-40H.

The thermal control elements 46A-46H control a temperature component of the nozzles 40A-40H to control a thermal property and a flow parameter of the first polymeric material, the second polymeric material or both flowing through the nozzles 40A-40H to provide a material flow stream of the first polymeric material, the second polymeric material, or both having a substantial uniform flow parameter at outlets 48A-48H of each of the nozzles 40A-40H. Thermal control elements 46A-46H are individually controllable to individually control a thermal component of an associated nozzle, which, in turn, individually controls a thermal property and flow parameter of the material flow stream of the first polymeric material, the second polymeric material, or both at the outlet 48 of an associated nozzle 40. Further, the thermal control elements are controllable as a group or groups of thermal control elements to control a group or groups of nozzles. In this manner, a group of the thermal control elements controls the temperature component of a group of nozzles to control a thermal property and a flow parameter of the first polymeric material, the second polymeric material, or both flowing through the group of nozzles to provide a material flow stream of the first polymeric material, the second polymeric material, or both at each outlet 48A-48H having a substantially uniform flow parameter. Alternatively, a single thermal control element may effect the material flow in more than one flow channel and therefore control a group of flow channels.

System 10C provides a benefit over prior art systems that use shooting pot technology to inject either a first polymeric material or a second polymeric material, or both into cavities of a mold to form a plurality of multilayer plastic articles. That is, the system 10C combines the use of shooting pot technology with various thermal flow balancing technologies and various thermal property distribution technologies for polymeric material flows to achieve a system and a mold having a plurality of cavities with a pitch size on the order of a pitch size for a mold for molding a plurality of monolayer plastic articles. More specifically, system 10C achieves a cavity-to-cavity variation of the first polymeric material entering each of the mold cavities 44A-44H on the order of +/−5% by weight and achieves a cavity-to-cavity variation of the second polymeric material entering each of the mold cavities 44A-44H on the order of +/−5% by weight.

Further, system 10C can achieve these results by performing either a sequential injection of a skin material using the first polymeric source 12 followed by a core or interior material using the second material source 14 or a simultaneous injection of the skin material using the first polymeric source 12 and the core or interior material using the second material source 14 to provide precise control of the inner and interior layers of a plurality of multiple layer plastic articles formed using the system 10C. Moreover, the reduction in the number of shooting pots utilized over the prior art systems in combination with the thermal balancing provided by thermal elements 46A-46H allow the mold 42 to realize a cavity pitch sizing of about 50 mm as compared to a cavity pitch sizing of about 75 mm minimum found in prior art injection molding systems using shooting pot technology without the thermal balancing or thermal distribution techniques of polymeric material taught by the present invention. The use of thermal balancing reduces the number of moving parts and consequently wear-parts by nearly half because thermal balancing can be implemented with no moving parts.

Figure 5:
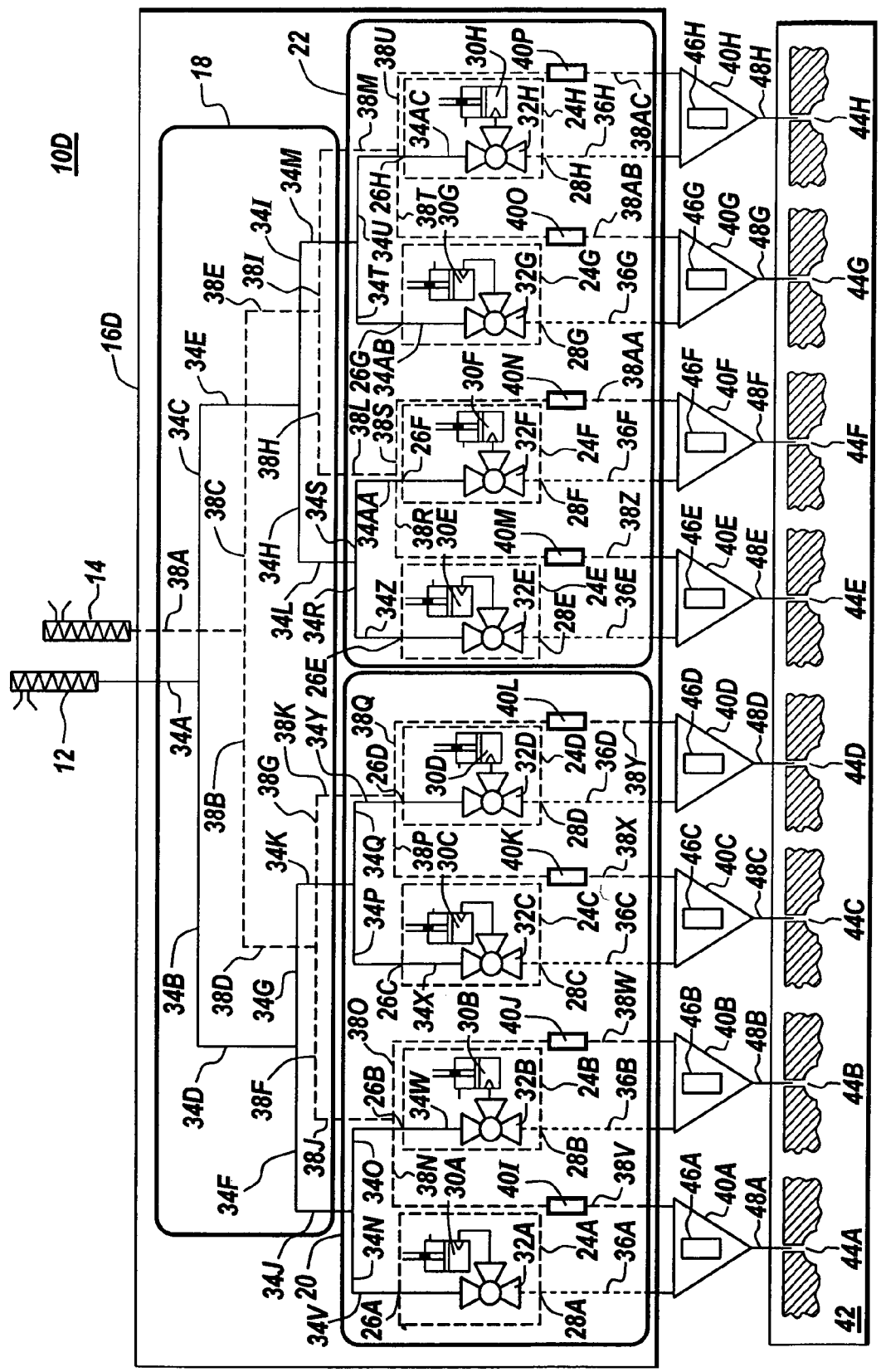
FIG. 5 illustrates a system for injection molding a plurality of multiple layer plastic articles using a plurality of shooting pots in combination with a thermal balancing technique in accordance with the teachings of the present invention.

FIG. 5 illustrates another exemplary system for injection molding a plurality of multiple layer plastic articles in accordance with the teachings of the present invention. System 10D includes additional thermal control elements located within the manifold system 16D to improve control of a thermal property and a flow parameter of a material flow of a second polymeric material from the second material source 14. Thermal control elements 40I-40P are associated with selected flow channels from the third set of flow channels 38A-38AC. In this manner, system 10D provides additional controllability of a temperature component of selected flow channels within the manifold system 16D to provide a material flow stream of the second polymeric material at an ingress port of each of the nozzles 40A-40H having a substantial uniform flow parameter.

Additionally, system 10D includes a first material source 12, a second material source 14, a manifold system 16D, a plurality of nozzles 40A-40H, and a mold 42 having a plurality of cavities 44A-44H to mold a plurality of multiple layer plastic articles. System 10D further includes a plurality of shooting pots 24A-24H. Shooting pots 24A-24H are associated with the first material source 12 for use in injecting each of the cavities 44A-44H with a controlled volume shot of a first polymeric material supplied by the first polymeric source 12.

Each of the shooting pots 24A-24H include a respective ingress port 26 to receive the first polymeric material from the first material source 12, a reservoir 30 to hold a volume of the first polymeric material, and an egress port 28 to feed there through a selected volume of the first polymeric material to a respective one of the nozzles 40A-40H.

Manifold system 16D includes a first set of flow channels 34A-34AC configured to distribute a material flow of the first polymeric material from the first material source 12 to ingress ports 26A-26H of the shooting pots 28A-28H. Further, the manifold system 16D includes a second set of flow channels 36A-36H configured to distribute and feed a controlled volume shot of the first polymeric material from the reservoirs 30A-30H through egress ports 28A-28H of each of the shooting pots 24A-24H to a first ingress port of each of the nozzles 40A-40H. Manifold system 16D includes a third set of flow channels 38A-38AC configured to distribute a material flow of the second polymeric material from the second material source 14 to a second ingress port of each of the nozzles 40A-40H.

Thermal control elements 40I-40P are individually controllable to individually control an associated flow channel, for example, control element 40I can be configured for individual control to individually control a temperature component of flow channel 38V. In the alternative, thermal control elements 40I-40P are controllable as one or more groups of thermal control elements to control a group or groups of bores or sub-bores forming the third set of flow channels 38A-38AC. Alternatively, a single thermal control element may effect the material flow in more than one flow channel and therefore control a group of flow channels.

Other grouping arrangements of the thermal control elements 40A-40P are possible. For example, thermal control element 40A and thermal control element 40I can be grouped as a pair to control the temperature component of the channel 40I and the temperature component of the nozzle 40A to control the thermal property and flow parameter of the second polymeric material at the outlet 48A of the nozzle 40A. Other groupings are possible, for example, a group formed by thermal control elements 46A, 46B, 40I and 40J to control the material flow of the second polymeric material at the outlets 48A and 48B of nozzles 40A and 40B. Those skilled in the art will appreciate that the just described groupings are illustrative and other thermal control element groupings are possible to control the flow of the second polymeric material through a portion or portions of the system 10D.

System 10D provides a benefit over prior art systems that use shooting pot technology to inject either a first polymeric material or a second polymeric material, or both into cavities of a mold to form a plurality of multilayer plastic articles. That is, the system 10D combines the use of shooting pot technology with various thermal flow balancing technologies and various thermal property distribution technologies for polymeric material flows to achieve a system and a mold having a plurality of cavities with a pitch size on the order of a pitch size for a mold for molding a plurality of monolayer plastic articles. More specifically, system 10D achieves a cavity-to-cavity variation of the first polymeric material entering each of the mold cavities 44A-44H on the order of +/−5% by weight and achieves a cavity-to-cavity variation of the second polymeric material entering each of the mold cavities 44A-44H on the order of +/−5% by weight.

Further, system 10D can achieve these results by performing either a sequential injection of a skin material using the first polymeric source 12 followed by a core or interior material using the second material source 14 or a simultaneous injection of the skin material using the first polymeric source 12 and the core or interior material using the second material source 14 to provide precise control of the inner and interior layers of a plurality of multiple layer plastic articles formed using the system 10D. Moreover, the reduction in the number of shooting pots utilized over the prior art systems in combination with the thermal balancing provided by thermal elements 46A-46H allow the mold 42 to realize a cavity pitch sizing of about 50 mm as compared to a cavity pitch sizing of about 75 mm minimum found in prior art injection molding systems using shooting pot technology without the thermal balancing or thermal distribution techniques of polymeric material taught by the present invention. The use of thermal balancing reduces the number of moving parts and consequently wear-parts by nearly half because thermal balancing can be implemented with no moving parts.

Figure 6:
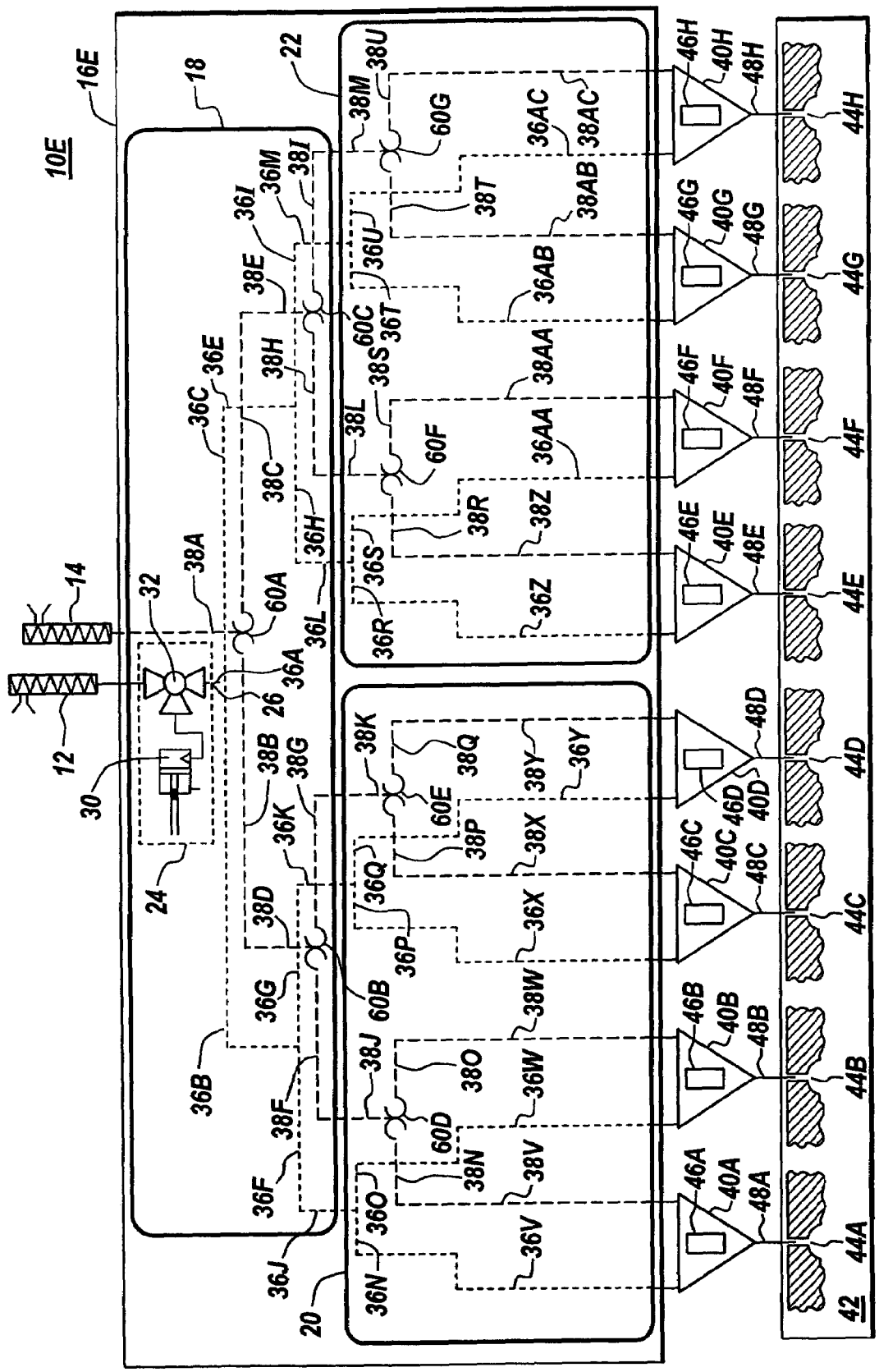
FIG. 6 illustrates a system for injection molding a plurality of multiple layer plastic articles using a single shooting pot in combination with a thermal distribution techniques in accordance with the teachings of the present invention.

FIG. 6 illustrates an exemplary system for injection molding a plurality of multiple layer plastic articles in accordance with the teachings of the present invention. System 10E includes a first material source 12 supplying a first polymeric material, a second material source 14 supplying a second polymeric material, a number of nozzles 48A-48H, a mold 42, and a manifold system 16E. The manifold system 16E is configured to distribute a material flow of the first polymeric material from the first material source 12 to each of the nozzles 48A-48H and distribute a material flow of the second polymeric material from the second material source 14 to each of the nozzles 48A-48H.

The manifold system 16E of system 10E is configured to distribute the material flow of the first polymeric material using shooting pot technology and to distribute the material flow of the second polymeric material using an approach to equalize distribution of a full bulk temperature of shear heated material. More specifically, manifold system 16E is configured to equalize distribution of the flow bulk temperature of the shear heated second polymeric material. To do so manifold system 16E includes an intersection geometry 60A-60G of non-intersecting axis's for selected flow channels, for example, flow channels 38A-38AC.

The intersection geometries 60A-60G where the central longitudinal axis of at least two of the flow channels forming the intersection avoid formation of a common point (i.e., non-intersecting axes) in each of the intersections 60A-60G to divide the shear heated material into substantially equal portions for each downstream channel of the intersection. For example, intersection 60A divides the shear heated material flow of the second polymeric material into substantially equal portions between flow channel 38B and flow channel 38C. Likewise, intersection 60B divides the shear heated material of the second polymeric material from flow channel 38B into substantially equal portions amongst flow channel 38F and 38G. A result of the intersections 60A-60G is the manifold system 16E provides the mold 42 with a plurality of working material flows of the second polymeric material having a substantially uniform pressure drop, a substantially uniform flow rate, and a substantially uniform thermal property. The geometry of intersections 60A-650G are illustrated in more detail with regard to FIGS. 13 and 14.

To inject a first polymeric material from the first material source 12 into cavities 44A-44H the system 10E includes a first flow channel 34 coupled between the first material source 12 and inlet port 26 of shooting pot 24 to feed reservoir 30. At the proper time, valve 32 operates to block any material flow of the first polymeric material from entering the ingress port 26 and opens a pathway to the egress port 26 to allow the shooting pot 24 to feed a controlled volume shot of the first polymeric material to a first ingress port of each of the nozzles 48A-48H using a second set of flow channels 36A-36G.

The system 10E can further include a number of thermal control elements 46A-46H configured to cooperatively control a temperature component of each of the nozzles 48A-48H. Thermal control elements 46A-46H allow control of a thermal property and a flow parameter of the first polymeric material, the second polymeric material, or both flowing through each of the nozzles 48A-48H to provide at outlets 48A-48H a material flow stream of the first polymeric material, the second polymeric material, or both having a substantially uniform flow parameter.

Thermal control elements 46A-46H are configurable so that each is individually controllable to individually control a temperature component of an associated nozzle or are configurable as a group or groups to control a group or groups of the thermal control elements, which, in turn, control a temperature component of a group or group of nozzles. Alternatively, a single thermal control element may effect the material flow in more than one flow channel and therefore control a group of flow channels.

System 10E provides a benefit over prior art systems that use shooting pot technology to inject either a first polymeric material or a second polymeric material, or both into cavities of a mold to form a plurality of multilayer plastic articles. That is, the system 10E combines the use of shooting pot technology with various thermal flow balancing technologies and various thermal property distribution technologies for polymeric material flows to achieve a system and a mold having a plurality of cavities with a pitch size on the order of a pitch size for a mold for molding a plurality of monolayer plastic articles. More specifically, system 10E achieves a cavity-to-cavity variation of the first polymeric material entering each of the mold cavities 44A-44H on the order of +/−5% by weight and achieves a cavity-to-cavity variation of the second polymeric material entering each of the mold cavities 44A-44H on the order of +/−5% by weight.

Further, system 10E can achieve these results by performing either a sequential injection of a skin material using the first polymeric source 12 followed by a core or interior material using the second material source 14 or a simultaneous injection of the skin material using the first polymeric source 12 and the core or interior material using the second material source 14 to provide precise control of the inner and interior layers of a plurality of multiple layer plastic articles formed using the system 10E. Moreover, the reduction in the number of shooting pots utilized over the prior art systems in combination with the thermal balancing provided by thermal elements 46A-46H allow the mold 42 to realize a cavity pitch sizing of about 50 mm as compared to a cavity pitch sizing of about 75 mm minimum found in prior art injection molding systems using shooting pot technology without the thermal balancing or thermal distribution techniques of polymeric material taught by the present invention. The use of thermal balancing reduces the number of moving parts and consequently wear-parts by nearly half because thermal balancing can be implemented with no moving parts.

Figure 7:
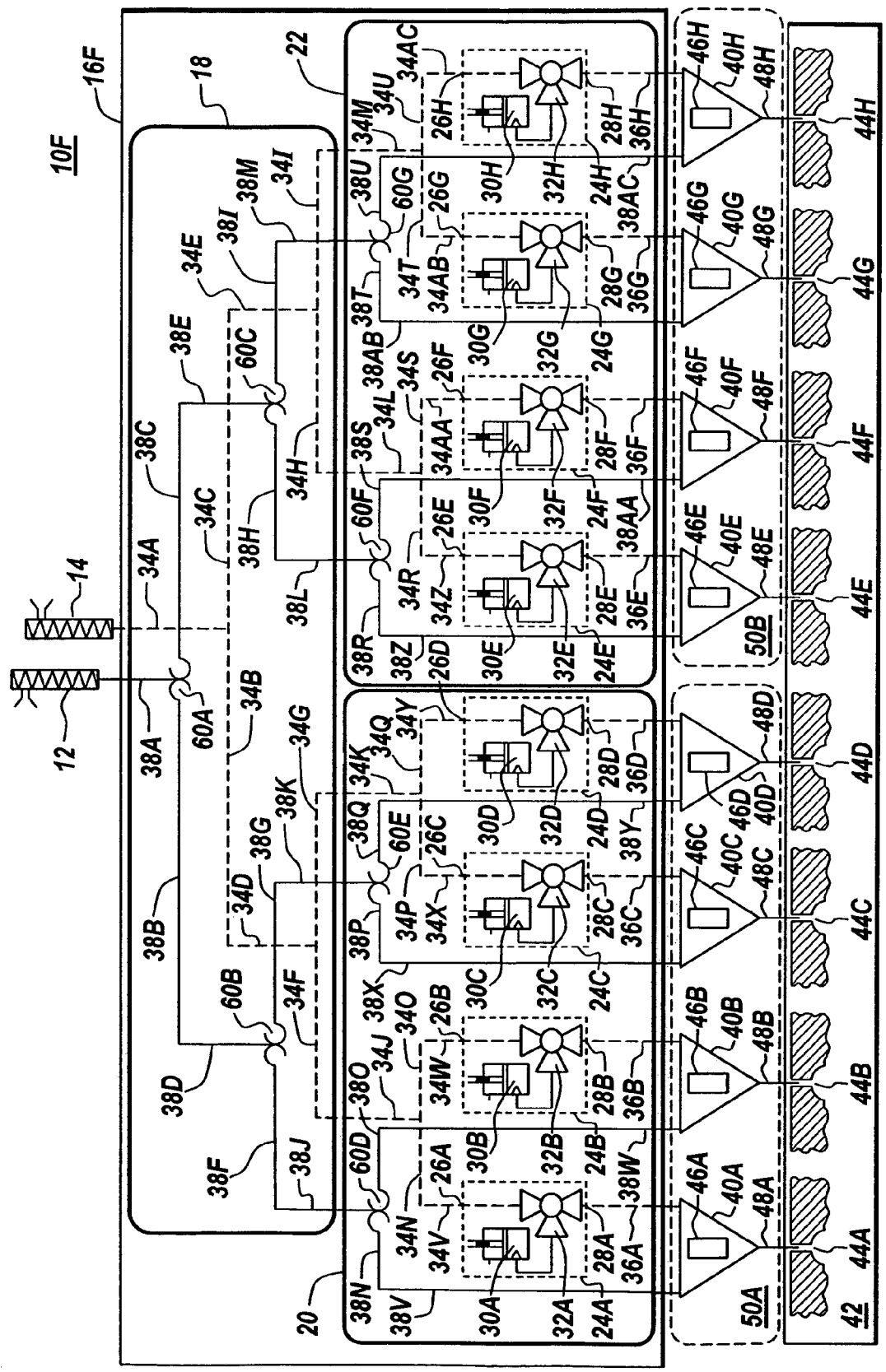
FIG. 7 depicts a system for injection molding a plurality of multiple layer plastic articles using a plurality of shooting pots in combination with thermal distribution techniques of polymeric material in accordance with the teachings of the present invention.

FIG. 7 illustrates an exemplary system for injection molding a plurality of multiple layer plastic articles in accordance with the teachings of the present invention. System 10F includes a first material source 12 supplying a first polymeric material, a second material source 14 supplying a second polymeric material, a manifold system 16F, a plurality of nozzles 40A-40H, and a mold 42 having a plurality of cavities 44A-44H to mold a plurality of multiple layer plastic articles. Manifold system 16F is configured to distribute a material flow of the first polymeric material from the first material source 12 to a first ingress port of each of the nozzles 40A-40H using shooting pot technology. Manifold system 16F is also configured to distribute a material flow of the second polymeric material from the second material source 14 to a second ingress port of each of the nozzles 40A-40H using a thermal property balancing and distribution technique for polymeric material flows.

The manifold system 16F includes a plurality of shooting pots 24A-24H to provide a one to one relationship between the number of shooting pots and the number of nozzles. Those skilled in the art will appreciate the manifold system 16F and, in particular, the system 10F can be configured with a one to many shooting pot to nozzle relationship. That is, for example, four shooting pots configured to feed the nozzles 40A-40H.

Manifold system 16F is configured to include a first set of flow channels 34A-34AC configured to distribute a material flow of the first polymeric material from the first material source 12 to the ingress ports 26A-26H of each of the shooting pots 24A-24H. A second set of flow channels 36A-36H is configured to distribute a controlled volume shot of the first polymeric material from the reservoirs 30A-30H feed through egress ports 28A-28H of each of the shooting pots 24A-24H to a first ingress port of each of the nozzles 48A-48H. The manifold system 16F includes a third set of flow channels 38A-38AC configured to distribute a material flow of the second polymeric material using an approach to equalize distribution of a full bulk temperature of shear heated material. More specifically, the third set of flow channels 38A-38AC equalize distribution of the full bulk temperature of the shear heated second polymeric material. Selected members of the third set of flow channels 38A-38AC include an intersection geometry 60A-60G of non-intersecting axes.

The intersection geometries 60A-60G where the central longitudinal axis of at least two of the flow channels forming the intersection avoid formation of a common point (i.e., non-intersecting axes) in each of the intersections 60A-60G to divide the shear heated material into substantially equal portions for each downstream channel of the intersection. For example, intersection 60A divides the shear heated second polymeric material into substantially equal portions between flow channel 38B and flow channel 38C. Likewise, intersection 60B divides the shear heated material of the second polymeric material from flow channel 38B into substantially equal portions amongst flow channel 38F and 38G. A result of the intersection geometries 60A-60G the manifold system 16F provides the mold 42 with a plurality of working material flows of the second polymeric material having a substantially uniform pressure drop, a substantially uniform flow rate, and a substantially uniform thermal property. The geometry of intersections 60A-60G are illustrated in more detail with regard to FIGS. 13 and 14.

The system 10F can further include a number of thermal control elements configured to cooperatively control a temperature component of each of the nozzles 48A-48H. The thermal control elements 46A-46H allow control of a thermal property and a flow parameter of the first polymeric material, the second polymeric material, or both flowing through each of the nozzles 48A-48H to provide at outlets 48A-48H a material flow stream of the first polymeric material, the second polymeric material, or both having a substantially uniform flow parameter. Alternatively, a single thermal control element may effect the material flow in more than one flow channel and therefore control a group of flow channels.

System 10F provides a benefit over prior art systems that use shooting pot technology to inject either a first polymeric material or a second polymeric material, or both into cavities of a mold to form a plurality of multilayer plastic articles. That is, the system 10F combines the use of shooting pot technology with various thermal flow balancing technologies and various thermal property distribution technologies for polymeric material flows to achieve a system and a mold having a plurality of cavities with a pitch size on the order of a pitch size for a mold for molding a plurality of monolayer plastic articles. More specifically, system 10F achieves a cavity-to-cavity variation of the first polymeric material entering each of the mold cavities 44A-44H on the order of +/−5% by weight and achieves a cavity-to-cavity variation of the second polymeric material entering each of the mold cavities 44A-44H on the order of +/−5% by weight.

Further, system 10F can achieve these results by performing either a sequential injection of a skin material using the first polymeric source 12 followed by a core or interior material using the second material source 14 or a simultaneous injection of the skin material using the first polymeric source 12 and the core or interior material using the second material source 14 to provide precise control of the inner and interior layers of a plurality of multiple layer plastic articles formed using the system 10F. Moreover, the reduction in the number of shooting pots utilized over the prior art systems in combination with the thermal balancing provided by thermal elements 46A-46H allow the mold 42 to realize a cavity pitch sizing of about 50 mm as compared to a cavity pitch sizing of about 75 mm minimum found in prior art injection molding systems using shooting pot technology without the thermal balancing or thermal distribution techniques of polymeric material taught by the present invention. The use of thermal balancing reduces the number of moving parts and consequently wear-parts by nearly half because thermal balancing can be implemented with no moving parts.

Figure 8:
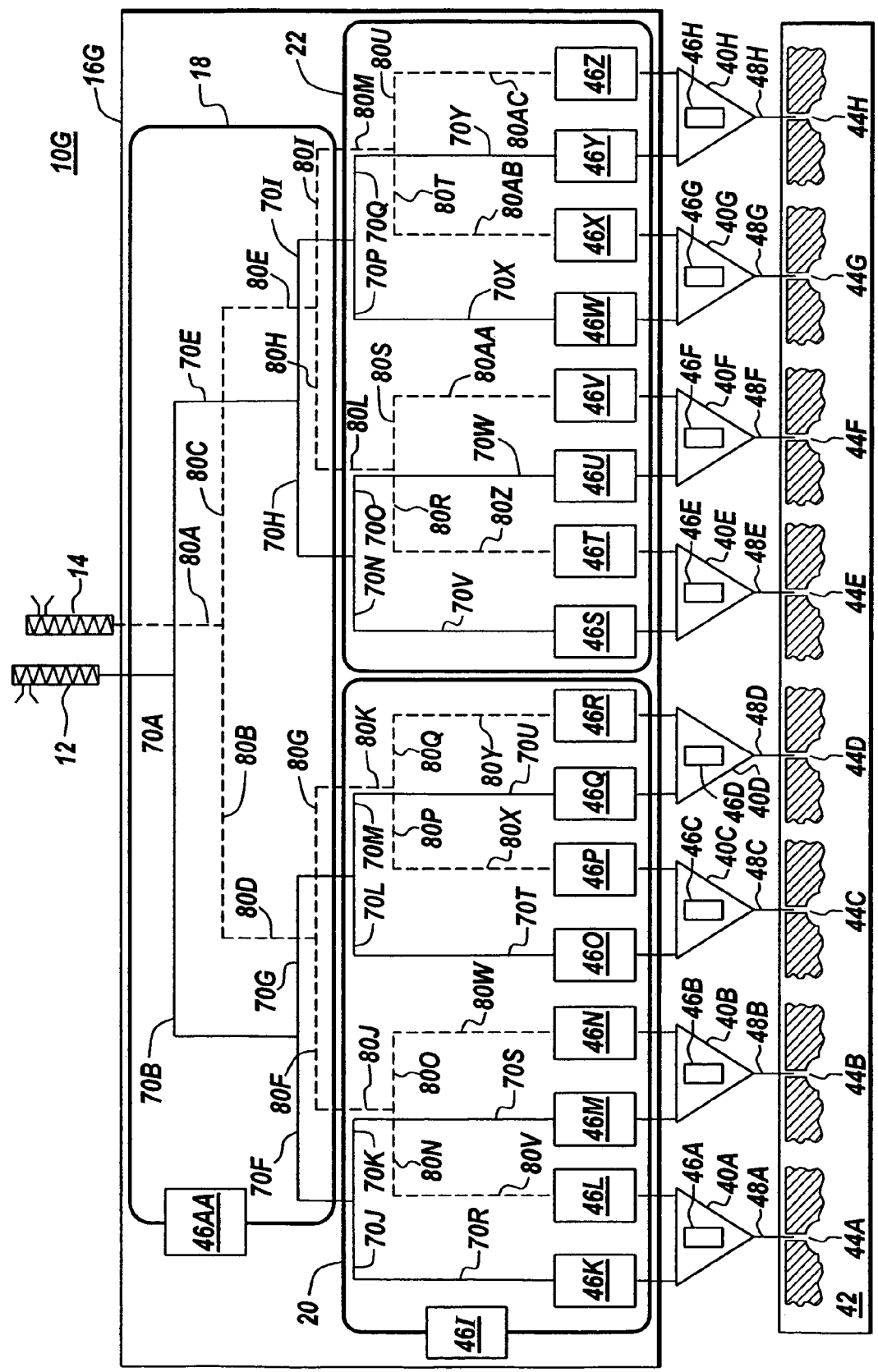
FIG. 8 illustrates a system for injection molding a plurality of multiple layer plastic articles using a combination of thermal balancing techniques for a material flow of a first polymeric material and thermal balancing techniques for a material flow of second polymeric material in accordance with teachings of the present invention.

FIG. 8 illustrates an exemplary system for injection molding a plurality of multiple layer plastic articles in accordance with the teachings of the present invention. System 10G includes a first material source 12 supplying a first polymeric material, a second material source 14 supplying a second polymeric material, a plurality of nozzles 40A-40H, and a mold 42 having a plurality of cavities 44A-44H to mold a plurality of multiple layer plastic articles. System 10G includes a manifold system 16G configured to distribute the first polymeric material from the first material source 12 and the second polymeric material from the second material source 14 to each of the nozzles 40A-40H to inject the first and second polymeric materials into each of the cavities 44A-44H.

The manifold system 16G is configured to distribute the first polymeric material from the first material source 12 using a plurality of thermal control elements distributed amongst the bores and sub-bores forming the flow channels between the first material source 12 and a first ingress port of each of the nozzles 40A-40H. Manifold system 16GE is also configured to distribute a material flow of the second polymeric material from the second material source 14 using a plurality of thermal control elements to control a thermal property and a flow parameter of the second polymeric material flowing through selected bores and sub-bores of the set of flow channels between the second material source 14 and a second ingress port of each of the nozzles 40A-40H to provide a material flow stream of the second polymeric material having a substantially uniform flow parameter at the second ingress port of each of the plurality of nozzles 40A-40H.

In one embodiment of the manifold system 16G, thermal control element 46AA is associated with the first manifold portion 18, thermal control element 46I is associated with the second manifold portion 20, and thermal control element 46J is associated with the third manifold portion 22. With this configuration, thermal control element 46AA controls a temperature component of the first manifold portion 18 to control the material flow of the first polymeric material, the second polymeric material, or both material flows through the bores and sub-bores of the first set of flow channels 70A-70I and the bores and sub-bores of the second set of flow channels 80A-80I formed in the first manifold portion 18. Likewise, thermal control element 46I controls a temperature component of the second manifold portion 20 to control the material flow of the first polymeric material, the second polymeric material, or both material flows through the bores and sub-bores of the set of flow channels 70J-70M and 70R-70U and the bores and sub-bores of the set of flow channels 80J-80M and 80R-80U formed in the second manifold portion 20. Further, thermal control element 46J controls a temperature component of the third manifold portion 22 to control the material flow of the first polymeric material, the second polymeric material, or both material flows through the bores and sub-bores of the set of flow channels 70N-70Q and 70V-70AC and the bores and sub-bores of the set of flow channels 80N-80Q and 80V-80AC formed in the third manifold portion 22. Thermal control elements 46AA, 46I, and 46J can each control either individually or in groups, or same combination thereof a temperature component of a group of flow channels in the system 10E to control a thermal property and a flow parameter of a material flow of the first polymeric material, a material flow of the second polymeric material, or both through selected portion of the manifold system 16G. Alternatively, a single thermal control element may effect the material flow in more than one flow channel and therefore control a group of flow channels.

Manifold system 16G is configurable to include a plurality of thermal control elements associated with individual bores or sub-bores of the first set of flow channels 70A-70AC or with individual bores or sub-bores of the second set of flow channels 80A-80AC to individually or cooperatively control a temperature component of each associated bore or sub-bore through which the first polymeric material or the second polymeric material flows. In this manner, association of the thermal control elements with individual bores or sub-bores from the first set of flow channels 70A-70AC or the second set of flow channels 80A-80AC, or both provides control of a thermal property and a flow parameter of the polymeric material flowing through the bore or sub-bore to provide a plurality of material flow streams of the first polymeric material or the second polymeric material or both to the ingress ports of nozzles 40A-40H. Further, the plurality of thermal control elements 46A-46AA can be controlled as one or more groups to cooperatively control a temperature component of a group of bores and sub-bores from the first set of flow channels 70A-70AC or the second set of flow channels 80A-80CC, or both provides control of a thermal property and a flow parameter of the polymeric material flowing through the bore or sub-bore to provide a plurality of material flow streams of the first polymeric material or the second polymeric material or both to the ingress of nozzles 40A-40H.

For example, thermal control element 46A, 46K, and 46L can be controlled individually or as a group with a common goal to provide a material flow stream of either the first polymeric material or the second polymeric material or both at the outlet 48A of the nozzle 40A having a substantial uniform flow parameter. In like manner, thermal control element 46A, 46K and 46L can be individually controllable to control a thermal property and a flow parameter of the first polymeric material, the second polymeric material, or both flowing through the second manifold portion 20 and the nozzle 40A to provide a material flow stream of the first polymeric material, the second polymeric material, or both at the outlet 48A of the nozzle 40A having a substantial uniform flow parameter. Those skilled in the art will appreciate other combinations are possible and are not limited to the illustrative examples just described.

System 10G provides a benefit over prior art systems that use shooting pot technology to inject either a first polymeric material or a second polymeric material, or both into cavities of a mold to form a plurality of multilayer plastic articles. That is, the system 10G combines the use of shooting pot technology with various thermal flow balancing technologies and various thermal property distribution technologies for polymeric material flows to achieve a system and a mold having a plurality of cavities with a pitch size on the order of a pitch size for a mold for molding a plurality of monolayer plastic articles. More specifically, system 10G achieves a cavity-to-cavity variation of the first polymeric material entering each of the mold cavities 44A-44H on the order of +/−5% by weight and achieves a cavity-to-cavity variation of the second polymeric material entering each of the mold cavities 44A-44H on the order of +/−5% by weight.

Further, system 10G can achieve these results by performing either a sequential injection of a skin material using the first polymeric source 12 followed by a core or interior material using the second material source 14 or a simultaneous injection of the skin material using the first polymeric source 12 and the core or interior material using the second material source 14 to provide precise control of the inner and interior layers of a plurality of multiple layer plastic articles formed using the system 10G. Moreover, the reduction in the number of shooting pots utilized over the prior art systems in combination with the thermal balancing provided by thermal elements 46A-46H allow the mold 42 to realize a cavity pitch sizing of about 50 mm as compared to a cavity pitch sizing of about 75 mm minimum found in prior art injection molding systems using shooting pot technology without the thermal balancing or thermal distribution techniques of polymeric material taught by the present invention. The exclusive use of thermal balancing and thermal distribution eliminates moving parts in the manifold assembly, and consequently wear-parts altogether because thermal balancing and thermal distribution can be implemented with no moving parts in the manifold assembly.

Figures 9, 10:
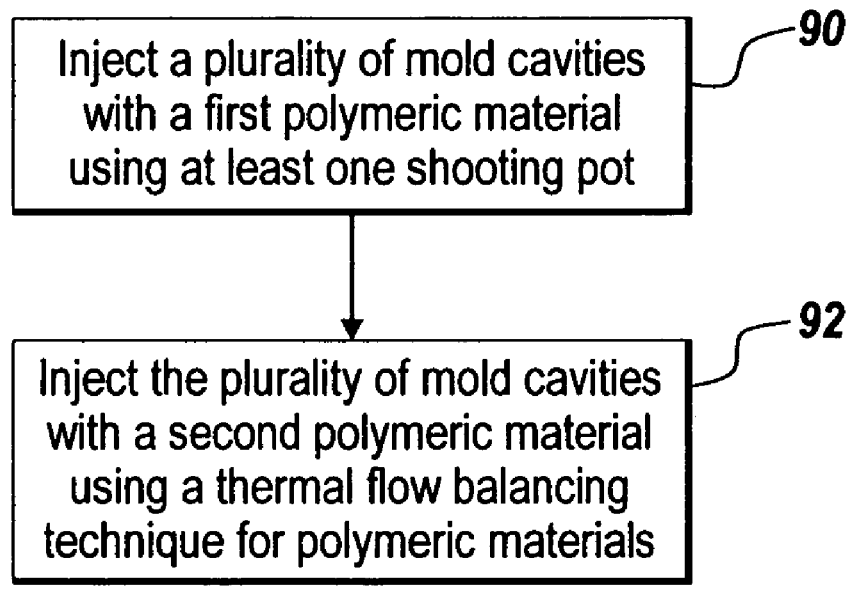
FIG. 9 is a block flow diagram illustrating steps taken to practice an illustrative embodiment of the present invention.
FIG. 10 is a block flow diagram illustrating steps taken to practice another embodiment in accordance with the teachings of the present invention.

FIG. 9 illustrates steps taken to practice an illustrative embodiment of the present invention. In step 90, a system for injection molding a plurality of multiple layer plastic articles injects a plurality of mold cavities with a first polymeric material using at least one shooting pot. In step 92, the system injects the plurality of mold cavities with a second polymeric material using a thermal flow balancing technique for polymeric materials.

Suitable thermal flow balancing techniques include, but are not limited to the use of thermal control elements associated with each of the nozzles of the system to cooperatively control a temperature component of each of the nozzles through which the second polymeric material flows. The temperature component of the nozzles is controllable using the thermal control elements to control a thermal property and a flow parameter of the second polymeric material flowing through each of the nozzles to provide a material flow stream of the second polymeric material at an outlet of each of the nozzles having a substantial uniform flow parameter.

Other suitable thermal flow balancing techniques include use of thermal control elements associated with individual flow channels of a manifold distributing a material flow of the second polymeric material from a material source to each of the nozzles. Further, the thermal flow balancing techniques used in step 92 can combine the use of the thermal control elements associated with the flow channels and the thermal control elements associated with the nozzles to control a thermal property and a flow parameter of the second polymeric material flowing through individual flow channels, a group of flow channels, individual nozzles, or a group of nozzles, or any combination thereof so that a material flow stream of the second polymeric material at an outlet of each of the nozzles has a substantial uniform flow parameter.

Those skilled in the art will appreciate that the thermal flow balancing techniques suitable for use in step 92 can also utilize thermal control elements associated with a portion of the manifold or a group of flow channels in a portion of the manifold to control a temperature component of the portion of the manifold or the group of flow channels in that manifold portion. Further, the thermal flow balancing techniques of step 92 allow for individual control over each thermal control element or for group control over a group of thermal control elements, for example, ganging several thermal control elements to control a group of nozzles or a group of flow channels.

FIG. 10 illustrates steps taken to practice another illustrative embodiment of the present invention. In step 100, a system for injection molding a plurality of multiple layer plastic articles injects a plurality of mold cavities with a first polymeric material using at least one shooting pot. In step 102, the system injects the plurality of mold cavities with a second polymeric material using a thermal property distribution technique for polymeric materials.

One suitable thermal property distribution technique is illustrated and discussed in detail with respect to FIGS. 6 and 7. More specifically, the system in step 102 uses an approach to equalize distribution of the flow bulk temperature of the shear heated second polymeric material. To do so, the system can include a manifold having an intersection geometry of non-intersecting axes for selected flow channels. The intersection geometries are such that the central longitudinal axis of at least two of the flow channels forming the intersection avoid formation of a common point (i.e., non-intersecting axes) in the intersection to divide the shear heated material into substantially equal portions of each downstream channel of the intersection.

Another suitable thermal property distribution technique for use to inject the plurality of mold cavities with the second polymeric material includes features added to the flow channel of the system such as flow diverters, flow rotation devices located in one or more flow channels, runner segments having a substantially circular diameter that leads to a spiraling non-circular beginning portions of a subsequent runner, or other features that reposition the asymmetric thermal conditions of the flow in a circumferential direction around the center of the path of a flow channel.

Figure 11:
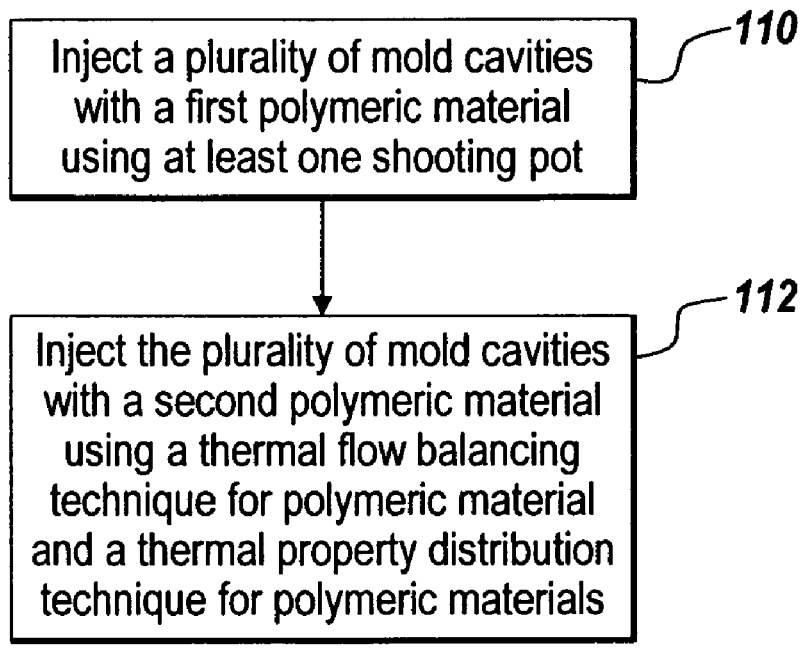
FIG. 11 is a block flow diagram depicting steps taken in accordance with the teachings of the present invention to practice an embodiment of the present invention.

FIG. 11 illustrates another exemplary flow chart illustrating steps taken to practice an embodiment of the present invention. In step 110, a system for injection molding a plurality of multiple layer plastic articles injects a plurality of mold cavities with a first polymeric material using at least one shooting pot. In step 112, the system injects the plurality of mold cavities with a second polymeric material using a thermal flow balancing technique for polymeric materials in a thermal property distribution technique for polymeric materials. Such suitable thermal balancing techniques and thermal property distribution techniques are discussed above in relation to FIGS. 9 and 10.

Figure 12:
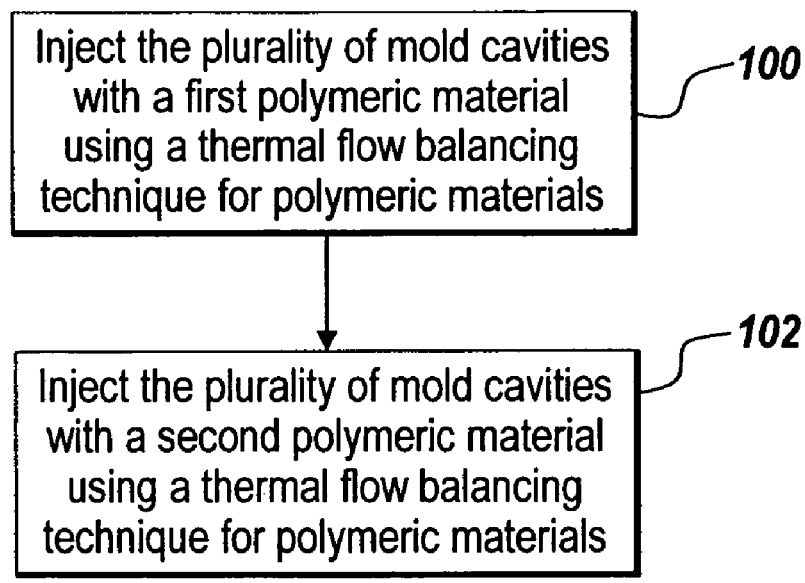
FIG. 12 is a block flow diagram illustrating steps taken to practice another illustrative embodiment of the present invention.

FIG. 12 illustrates steps taken to practice another illustrative embodiment of the present invention. In step 120, a system for injection molding a plurality of multiple layer plastic articles injects a plurality of mold cavities with a first polymeric material using the thermal flow balancing technique well suited for polymeric materials. In step 122, the system injects the plurality of mold cavities with a second polymeric material using a thermal flow balancing technique suitable for polymeric materials. Those skilled in the art will appreciate that step 120 and 122 can happen in a simultaneous manner or in a sequential manner to mold the plurality of multiple layer plastic articles. Suitable thermal flow balancing techniques for use in step 120 and 122 are discussed above in relation to FIGS. 9 and 10.

Figure 13:
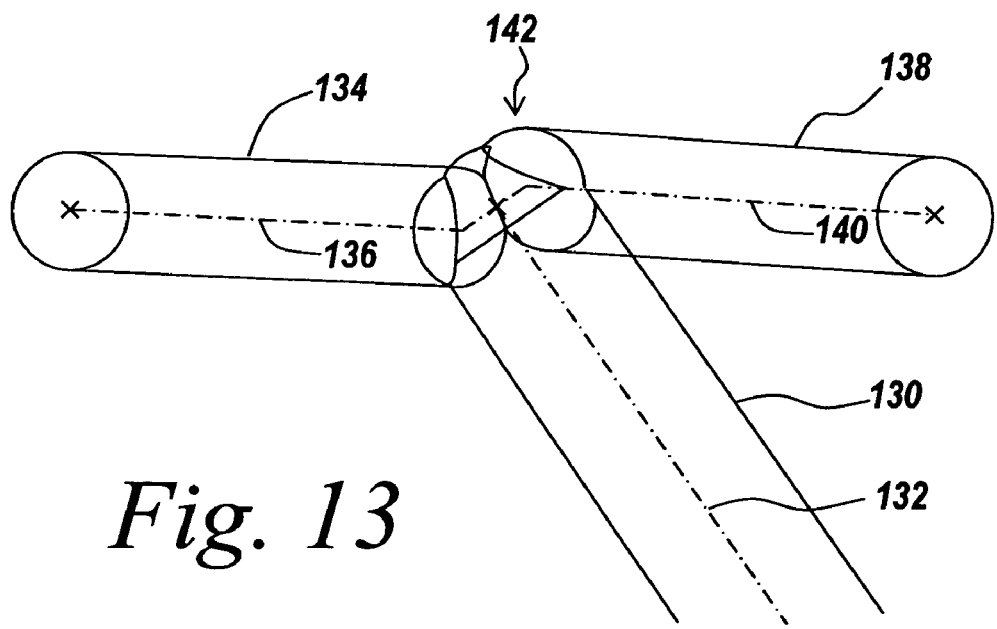
FIG. 13 depicts an exemplary top view of an exemplary two-way split in a hot runner in accordance with one aspect of the present invention.
Figure 14:
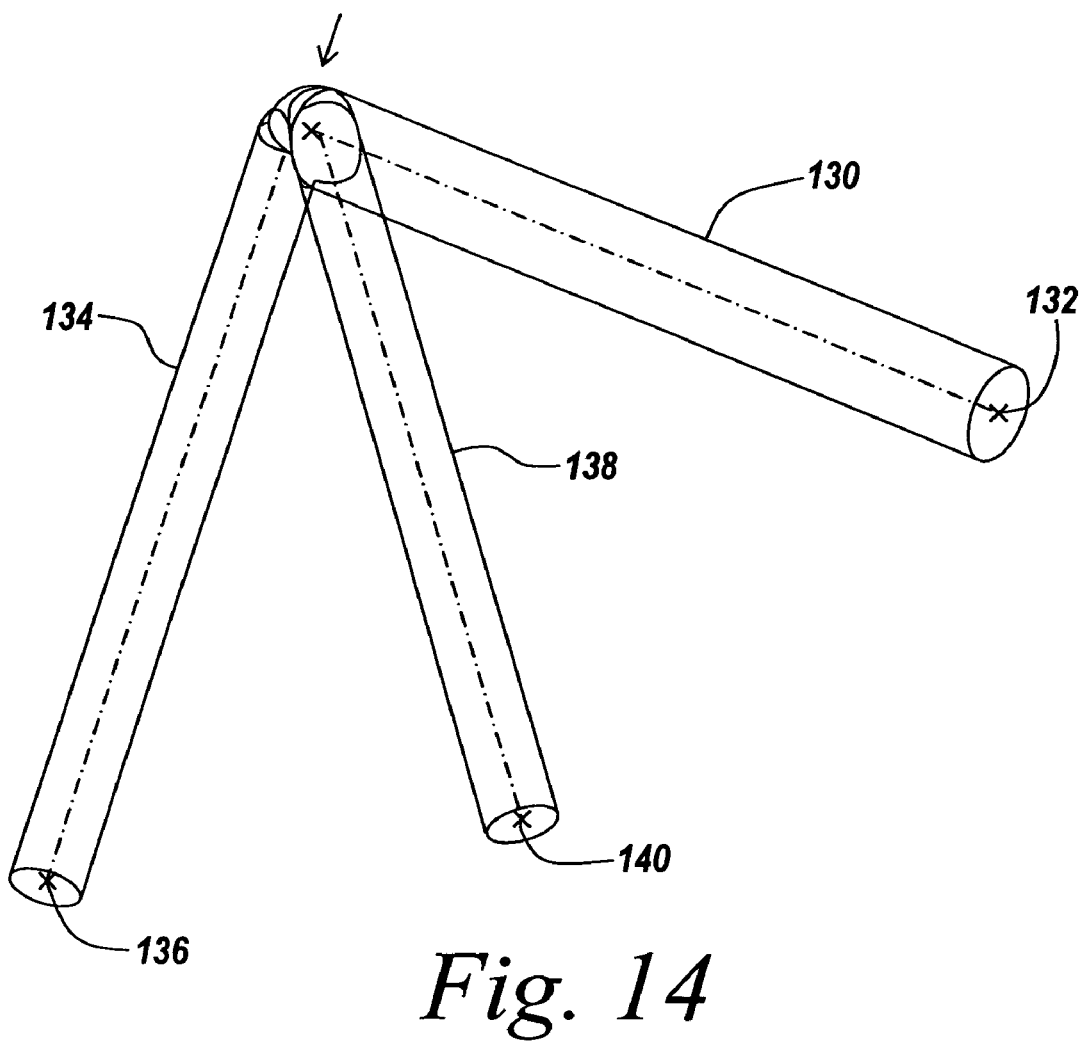
FIG. 14 depicts an exemplary isometric view of the two-way split illustrated in FIG. 13.

FIGS. 13 and 14 illustrate the intersection geometry of a two way split in accordance with the teachings of the present invention. The intersection 142 is formed by a first bore 130, a second bore 134, and a third bore 138. The intersection 142 has a geometry free of a common point where central longitudinal axis 132 of the first bore 130, central longitudinal axis 136 of the second bore 134, and central longitudinal axis 140 of the third bore 138 intersect. That is, the central longitudinal axis 132 of first bore 130, the central longitudinal axis 136 of second bore 134, and the central longitudinal axis 140 of third bore 138 are offset from each other so that none of the central longitudinal axes intersect in intersection 142. According to another practice, one or more of the bores can be offset relative to the remaining bores so that the longitudinal central axes of all the bores do not meet or intersect at a common point.

Moreover, the geometry and architecture depicted in FIGS. 13 and 14 accomplishes the balancing and distribution of one or more properties of a working material through a network of distribution elements without the need for an element, positioner, repositioner, or member in communication with one or more of the distribution elements to balance and distribute a thermal property of the working material through the network. Furthermore, the balancing and distribution of one or more properties of the working material through the network of distribution elements occurs where the elements intersect, which, in turn, eases the manufacture of such a distribution means. Other intersection geometries and architectures suitable for use with the present invention are described in U.S. application Ser. No. 10/851,610, the contents of which are incorporated herein.

Figure 15:
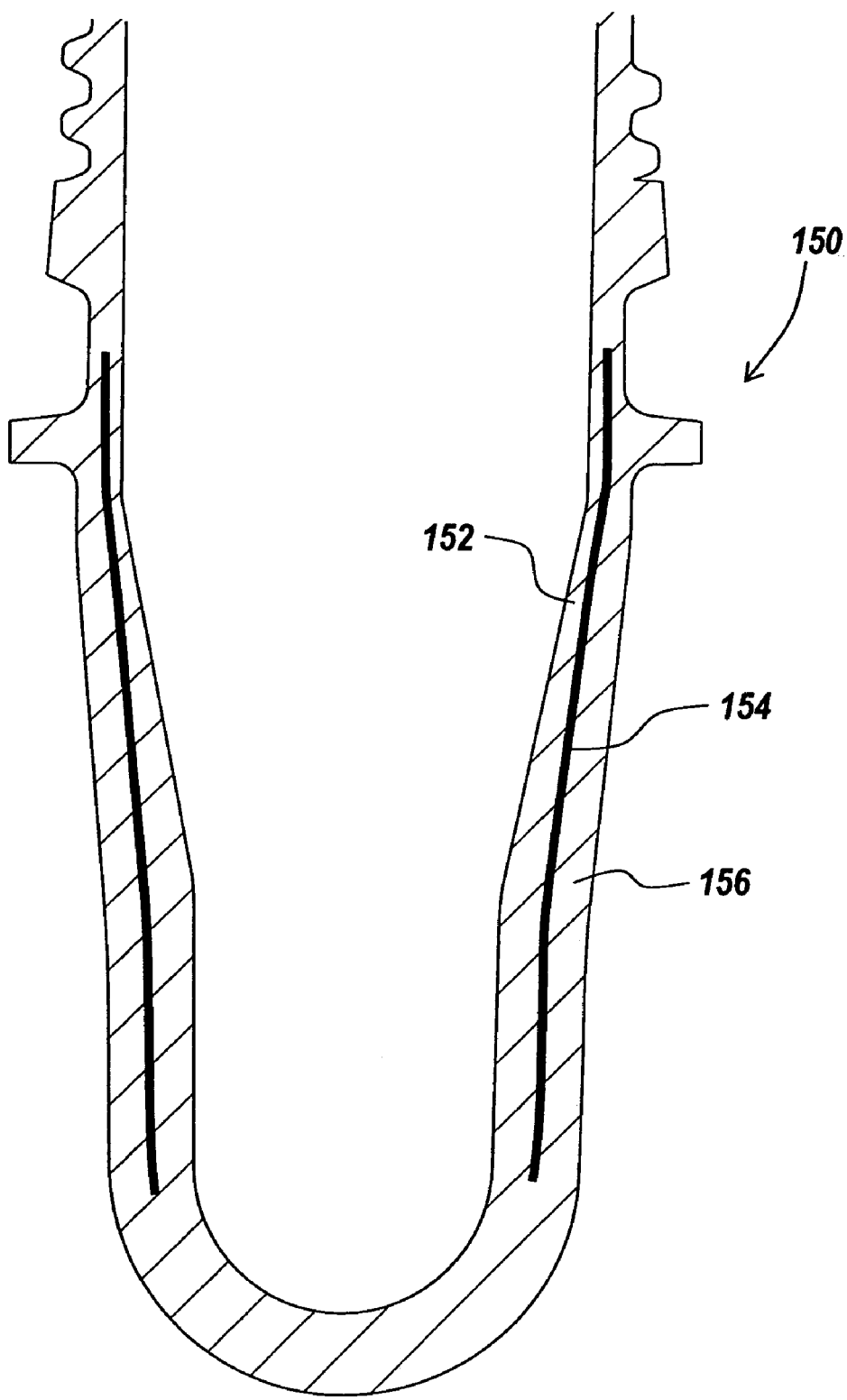
FIG. 15 illustrates an exemplary plastic article having a three-layer construction formed in accordance with the teachings of the present invention.

FIG. 15 illustrates and exemplary plastic article formed in accordance with the teachings of the present invention. Preform 150 is a multi-layer plastic article having a three-layer construction. That is, preform 150 includes a skin or interior layer 152, a core or interior layer 154 and an outer layer 156. Those skilled in the art will appreciate preform 150 is merely illustrative of a type of plastic article capable of being formed in accordance with the systems and methods of the present invention.

Figure 16:
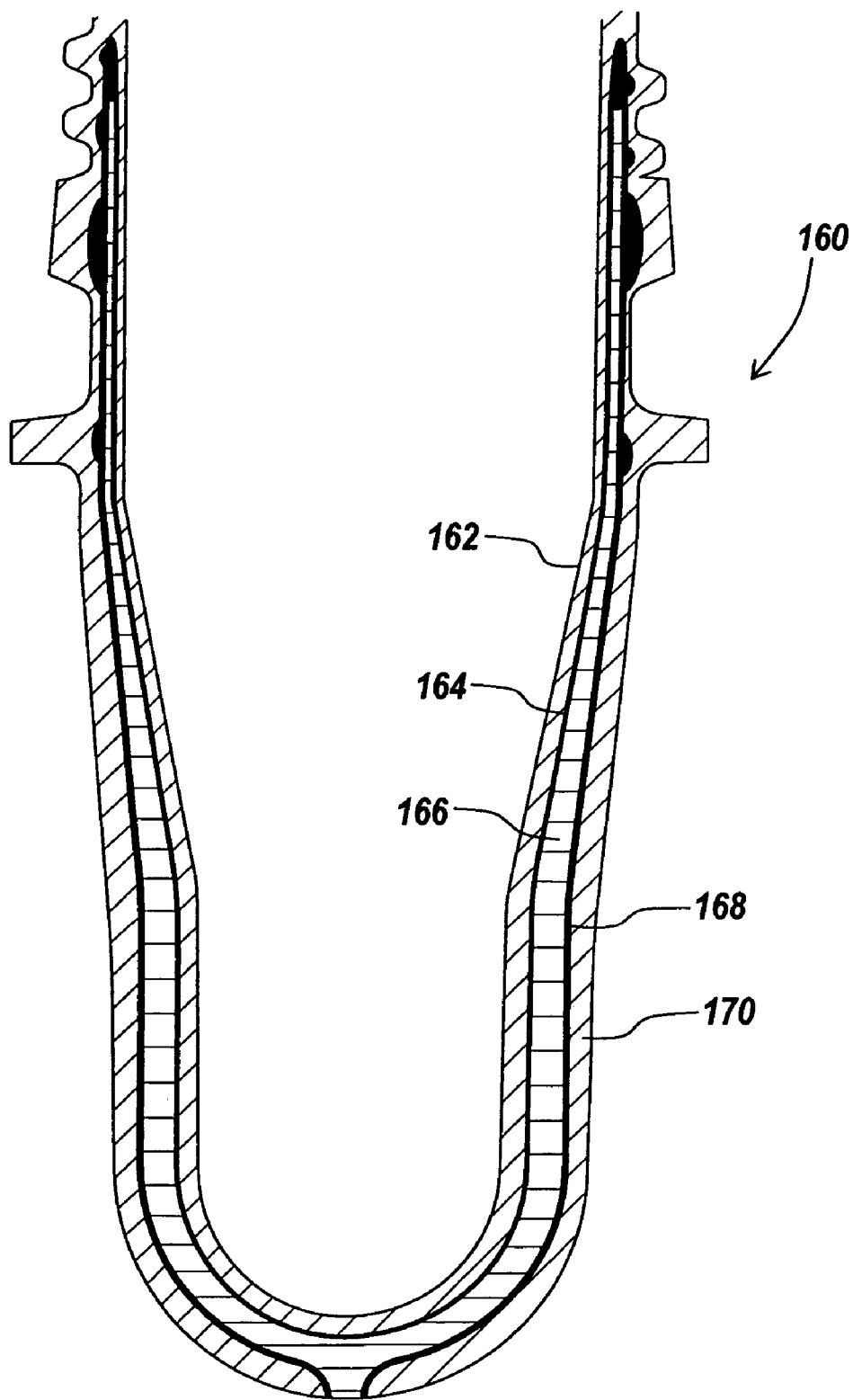
FIG. 16 illustrates an exemplary plastic article having a five-layer construction formed in accordance with the teachings of the present invention.

FIG. 16 illustrates a plastic article formed in accordance with the teachings of the present invention having a five-layer construction. Preform 160 includes a first layer 162, a second layer 164, a third layer 166, a fourth layer 168, and a fifth layer 170. Those skilled in the art will appreciate the preform 160 is merely one example of a type of plastic article capable of being formed in accordance with the systems and methods taught by the present invention.

While the present invention has been described with reference to the above illustrative embodiments, those skilled in the art will appreciate that various changes in form and detail may be made without departing from the intended scope of the present invention as defined in the appended claims. For example, although selected embodiments are described herein a flow bore intersection geometry and architecture for distribution of shear heated polymeric material to down stream bores, other suitable thermal property distribution techniques are well suited for use with any embodiment of the present invention. That is, a system or method in accordance with the teachings of the present invention having a thermal property distribution technique for use to inject the plurality of mold cavities with a polymeric material can include features added to the flow channel of the system such as flow diverters, flow rotation devices located in one or more flow channels, runner segments having a substantially circular diameter that leads to a spiraling non-circular beginning portions of a subsequent runner, or other features that reposition the asymmetric thermal conditions of the flow in a circumferential direction around the center of the path of a flow channel.

Further, those skilled in the art will appreciate that different injection processes are used with different nozzle constructions to create various layer structures in the molded article. Each of these injection strategies changes the relative importance of various injection parameters in the process but all of them require some control over the shot volume, volumetric flow rate, start of injection, end of injection or relative volumetric flow rate of a first and second material in order to control the position and thickness of the layer structure. Controlling the flow of a first and second material to allow for the control of the required injection parameters for each process is the focus of this invention and those skilled in the art will understand that, although only two basic injection approaches are described (i.e., simultaneous and sequential), the teachings of the present invention apply to the distribution and control of materials in injection processes and nozzle constructions used to create a multi-layered plastic article.

What is claimed is:

1. A system for injection molding a plurality of multiple layer plastic articles, the system comprising,
   a mold having a plurality of cavities to mold a plurality of multiple layer plastic articles;
   a first material source to supply a first polymeric material for use in forming at least one layer of each of the plurality of multiple layer plastic articles;
   a second material source to supply a second polymeric material for use in forming at least one layer of each of the plurality of multiple layer plastic articles;
   a plurality of nozzles in communication with a portion of the mold to inject the first and second polymeric materials into each of the plurality of cavities;
   a plurality of shooting pots, each of the plurality of shooting pots having an ingress port to receive the first polymeric material, a reservoir to hold a volume of the first polymeric material, and an egress port to feed there through a selected volume of the first polymeric material held by the reservoir;
   a first set of flow channels configured to distribute the first polymeric material from the first material source to the ingress port of each of the plurality of shooting pots;
   a second set of flow channels configured to distribute the first polymeric material from the egress port of each of the plurality of shooting pots to each of the plurality of nozzles to feed each of the plurality of nozzles with a controlled volume shot of the first polymeric material;
   a third set of flow channels configured to distribute the second polymeric material from the second material source to each of the plurality of nozzles; and
   a plurality of thermal control elements configured to cooperatively control a temperature component of a portion of the system through which the second polymeric material flows, the temperature component of the portion of the system being controllable to control a thermal property and a flow parameter of the second polymeric material flowing through the portion of the system to provide a material flow stream of the second polymeric material at an outlet of each of the plurality of nozzles having a substantial uniform flow parameter.

2. The system of claim 1, wherein the first polymeric material forms one of an inner layer, an interior layer or an outer layer of each of the plurality of multiple layer plastic articles.

3. The system of claim 1, wherein the second polymeric material forms one of an inner layer, an interior layer or an outer layer of each of the plurality of multiple layer plastic articles.

4. The system of claim 1, wherein the plurality of shooting pots and the plurality of nozzles have a one to one relationship.

5. The system of claim 1, wherein the plurality of shooting pots in combination with the plurality of nozzles comprises,
   a first group of nozzles in communication with a first portion of the mold to inject the first and second polymeric materials into the plurality of cavities associated with the first portion of the mold;
   a second group of nozzles in communication with a second portion of the mold to inject the first and second polymeric materials into the plurality of cavities associated with the second portion of the mold;
   a first shooting pot having an ingress port to receive the first polymeric material, a reservoir to hold a volume of the first polymeric material, and an egress port to feed there through a selected volume of the first polymeric material held by the reservoir to feed each nozzle forming the first group of nozzles with a controlled volume shot of the second polymeric material; and
   a second shooting pot having an ingress port to receive the first polymeric material, a reservoir to hold a volume of the first polymeric material, and an egress port to feed there through a selected volume of the first polymeric material held by the reservoir to each nozzle forming the second group of nozzles with a controlled volume shot of the first polymeric material.

6. The system of claim 1, wherein the system sequentially injects the first polymeric material and the second polymeric material into each of the plurality of mold cavities to mold the plurality of multiple layer plastic articles.

7. The system of claim 1, wherein the system simultaneously injects the first polymeric material and the second polymeric material into each of the plurality of mold cavities to mold the plurality of multiple layer plastic articles.

8. The system of claim 1, wherein the plurality of thermal control elements are associated with the plurality of nozzles to control a temperature component of each of the plurality of nozzles, each of the plurality of thermal control elements being individually controllable to individually control the temperature component of each of the plurality of nozzles to control the thermal property and the flow parameter of at least the second polymeric material through each of the plurality of nozzles.

9. The system of claim 1, wherein the plurality of thermal control elements are associated with a group of nozzles selected from the plurality of nozzles to control a temperature component of the group of nozzles as a group, the plurality of thermal control elements being controllable as a group to control the temperature component of the group of nozzles to control the thermal property and the flow parameter of at least the second polymeric material through the group of nozzles.

10. The system of claim 1, wherein the plurality of thermal control elements are associated with each channel member of the third set of flow channels to control a temperature component of each channel member, each of the plurality of thermal control elements being individually controllable to individually control the temperature component of each channel member of the third set of flow channels to control the thermal property and the flow parameter of the second polymeric material through each channel member forming the third set of flow channels.

11. The system of claim 1, wherein the plurality of thermal control elements are associated with a group of channel members selected from the third set of flow channels to control a temperature component of the selected channel members as a group, the plurality of thermal control elements being controllable as a group to control the temperature component of the group of selected channel members to control the thermal property and the flow parameter of the second polymeric material through the group of selected channel members.

12. The system of claim 1, wherein the plurality of thermal control elements comprise elements selected from a heater element, a cooling element, an insulator element, or a thermal conduction element.

13. The system of claim 1, wherein the third set of flow channels comprises,
   a plurality of flow channels configured to distribute a shear heated portion of the second polymeric material amongst the plurality of channels to feed each of the plurality of nozzles with a material flow of the second polymeric material from the second material source, each material flow of the second polymeric material having a substantially uniform flow rate and a substantially uniform distribution of the shear heated second polymeric material at an ingress port of each of the plurality of nozzles.

14. A system for injection molding a plurality of multiple layer plastic articles, the system comprising,
   a mold having a plurality of cavities to mold a plurality of multiple layer plastic articles;
   a first material source to supply a first polymeric material for use in forming at least one layer of each of the plurality of multiple layer plastic articles;
   a second material source to supply a second polymeric material for use in forming at least one layer of each of the plurality of multiple layer plastic articles;
   a plurality of nozzles in communication with the mold to inject the first and second polymeric materials into the plurality of cavities;
   a first shooting pot having an ingress port to receive the first polymeric material, a reservoir to hold a volume of the first polymeric material, and an egress port to feed there through a selected volume of the first polymeric material held by the reservoir;
   a second shooting pot having an ingress port to receive the second polymeric material, a reservoir to hold a volume of the second polymeric material, and an egress port to feed there through a selected volume of the second polymeric material held by the reservoir to feed each of the plurality of nozzles with a controlled volume shot of the second polymeric material;
   a first set of flow channels configured to distribute the first polymeric material from the first material source to the ingress port of the first shooting pot;
   a second set of flow channels configured to distribute the first polymeric material from the egress port of the first shooting pot to each of the plurality of nozzles to feed each of the plurality of nozzles with a controlled volume shot of the first polymeric material;
   a third set of flow channels configured to distribute the second polymeric material from the second material source to the ingress port of the second shooting pot;
   a fourth set of flow channels configured to distribute the second polymeric material from the egress port of the second shooting pot to each of the plurality of nozzles to feed each of the plurality of nozzles with a volume shot of the second polymeric material; and
   a plurality of thermal control elements configured to cooperatively control a temperature component of a portion of the system through which at least one of the first and second polymeric materials flows, the temperature component of the portion of the system being controllable to control a thermal property and a flow parameter of at least one of the first and second polymeric materials flowing through the portion of the system to provide a material flow stream of at least one of the first and second polymeric materials at an outlet of each of the plurality of nozzles having a substantial uniform flow parameter.

15. The system of claim 14, wherein the first polymeric material forms one of an inner layer, an interior layer or an outer layer of each of the plurality of multiple layer plastic articles.

16. The system of claim 14, wherein the second polymeric material forms one of an inner layer, an interior layer or an outer layer of each of the plurality of multiple layer plastic articles.

17. The system of claim 14, wherein the system sequentially injects the first polymeric material and the second polymeric material into each of the plurality of mold cavities to mold the plurality of multiple layer plastic articles.

18. The system of claim 14, wherein the system simultaneously injects the first polymeric material and the second polymeric material into each of the plurality of mold cavities to mold the plurality of multiple layer plastic articles.

19. The system of claim 14, wherein the plurality of thermal control elements are associated with the plurality of nozzles to control a temperature component of each of the plurality of nozzles, each of the plurality of thermal control elements being individually controllable to individually control the temperature component of each of the plurality of nozzles to control the thermal property and the flow parameter of at least one of the first and second polymeric materials flowing through each of the plurality of nozzles.

20. The system of claim 14, wherein the plurality of thermal control elements are associated with a group of nozzles selected from the plurality of nozzles to control a temperature component of the selected nozzles as a group, the plurality of thermal control elements being controllable as a group to control the temperature component of the group of nozzles to control the thermal property and the flow parameter of at least one of the first and second polymeric materials flowing through the group of nozzles.

21. The system of claim 14, wherein the plurality of thermal control elements are associated with each channel member of the second set of flow channels to control a temperature component of each channel member, each of the plurality of thermal control elements being individually controllable to individually control the temperature component of each channel member of the second set of flow channels to control the thermal property and the flow parameter of the first polymeric material through each channel member forming the second set of flow channels.

22. The system of claim 14, wherein the plurality of thermal control elements are associated with selected channel members of the second set of flow channels to control a temperature component of the selected channel members as a group, the plurality of thermal control elements being controllable as a group to control the temperature component of the group of selected channel members to control the thermal property and the flow parameter of the first polymeric material through the group of selected channel members.

23. The system of claim 14, wherein the plurality of thermal control elements are associated with each channel member of the fourth set of flow channels to control a temperature component of each channel member, each of the plurality of thermal control elements being individually controllable to individually control the temperature component of each channel member of the fourth set of flow channels to control the thermal property and the flow parameter of the second polymeric material through each channel member forming the fourth set of flow channels.

24. The system of claim 14, wherein the plurality of thermal control elements are associated with selected channel members of the fourth set of flow channels to control a temperature component of the selected channel members as a group, the plurality of thermal control elements being controllable as a group to control the temperature component of the group of selected channel members to control the thermal property and the flow parameter of the second polymeric material through the group of selected channel members.

25. The system of claim 14, wherein the plurality of thermal control elements comprise elements selected from a heater element, a cooling element, an insulator element, or a thermal conduction element.

26. A system for injection molding a plurality of multiple layer plastic articles, the system comprising,
   a mold having a plurality of cavities to mold a plurality of multiple layer plastic articles;
   a first material source to supply a first polymeric material for use in forming at least one layer of each of the plurality of multiple layer plastic articles;
   a second material source to supply a second polymeric material for use in forming at least one layer of each of the plurality of multiple layer plastic articles;
   a plurality of nozzles in communication with a portion of the mold to inject the first and second polymeric materials into each of the plurality of cavities;
   a shooting pot having an ingress port to receive at least the second polymeric material, a reservoir to hold a volume of the second polymeric material, and an egress port to feed there through a selected volume of the second polymeric material held by the reservoir to feed each of the plurality of nozzles with a controlled volume shot of the second polymeric material;
   a first plurality of flow channels configured to distribute a shear heated portion of the first polymeric material amongst the plurality of channels to feed each of the plurality of nozzles with a material flow of the first polymeric material from the first material source, each material flow of the first polymeric material having a substantially uniform flow rate and a substantially uniform distribution of the shear heated first polymeric material at an ingress port of each of the plurality of nozzles,
   a second plurality of flow channels configured to distribute the second polymeric material from the second material source to the ingress port of each of the plurality of shooting pots; and
   a third plurality of flow channels configured to distribute the second polymeric material from the egress port of each of the plurality of shooting pots to each of the plurality of nozzles to feed each of the plurality of nozzles with the controlled volume shot of the second polymeric material from a related shooting pot.

27. In a system a method for injection molding a plurality of multiple layer plastic articles, the method comprising the steps of,
   injecting using, a shooting pot, a first polymeric material into a plurality of cavities of a mold to form a first layer of each of the plurality of multiple layer plastic articles; and
   injecting using a thermal balancing technique a second polymeric material into the plurality of cavities of the mold to form a second layer of each of the plurality of multiple layer plastic articles,
   wherein the thermal balancing technique controls a plurality of thermal control elements configured to cooperatively control a temperature component of a portion of the system through which the second polymeric material flows, the temperature component of the portion of the system being controllable to control a thermal property and a flow parameter of the second polymeric material flowing through the portion of the system to provide a material flow stream of the second polymeric material at an outlet of each of a plurality of nozzles having a substantial uniform flow parameter.

28. The method of claim 27, wherein the steps of injecting are performed in a sequential manner.

29. The method of claim 27, wherein the steps of injecting are performed in a simultaneous manner.

30. In a system a method for injection molding a plurality of multiple layer plastic articles, the method comprising the steps of,
   injecting using, a shooting pot, a first polymeric material into a plurality of cavities of a mold to form a first layer of each of the plurality of multiple layer plastic articles; and
   injecting using a thermal distribution technique a second polymeric material into the plurality of cavities of the mold to form a second layer of each of the plurality of multiple layer plastic articles,
   wherein the thermal distribution technique distributes a shear heated portion of the second polymeric material amongst a plurality of channels to feed each of a plurality of nozzles in the system with a material flow of the second polymeric material from a second material source, and
   wherein each material flow of the second polymeric material has a substantially uniform flow rate and a substantially uniform distribution of the shear heated second polymeric material at an ingress port of each of the plurality of nozzles.

31. The method of claim 30, wherein the steps of injecting are performed in a sequential manner.

32. The method of claim 30, wherein the steps of injecting are performed in a simultaneous manner.

33. In a system a method for injection molding a plurality of multiple layer plastic articles, the method comprising the steps of,
   injecting using, a shooting pot, a first polymeric material into a plurality of cavities of a mold to form a first layer of each of the plurality of multiple layer plastic articles; and
   injecting using a thermal distribution technique and a thermal balancing technique a second polymeric material into the plurality of cavities of the mold to form a second layer of each of the plurality of multiple layer plastic articles,
   wherein the thermal distribution technique distributes a shear heated portion of the second polymeric material amongst a plurality of channels to feed each of a plurality of nozzles in the system with a material flow of the second polymeric material from a second material source, each material flow of the second polymeric material has a substantially uniform flow rate and a substantially uniform distribution of the shear heated second polymeric material at an ingress port of each of the plurality of nozzles, and
   wherein the thermal balancing technique controls a plurality of thermal control elements configured to cooperatively control a temperature component of a portion of the system through which the second polymeric material flows, the temperature component of the portion of the system being controllable to control a thermal property and a flow parameter of the second polymeric material flowing through the portion of the system to provide a material flow stream of the second polymeric material at an outlet of each of a plurality of nozzles having a substantial uniform flow parameter.

34. The method of claim 33, wherein the steps of injecting are performed in a sequential manner.

35. The method of claim 33, wherein the steps of injecting are performed in a simultaneous manner.

36. The system of claim 1, wherein the third set of flow channels are configured to distribute the second polymeric material from the second material source directly to each of the plurality of nozzles.

37. The method of claim 30, wherein the plurality of channels directly feed each of the plurality of nozzles with the second polymeric material from the second material source.

38. The method of claim 33, wherein the plurality of channels directly feed each of the plurality of nozzles with the second polymeric material from the second material source.

* * * * *